(12) United States Patent
Zhang et al.

(10) Patent No.: US 12,703,094 B2
(45) Date of Patent: Aug. 11, 2026

(54) SWING-UP MOTION METHOD AND APPARATUS OF ROBOT, ROBOT, AND STORAGE MEDIUM

(71) Applicant: TENCENT TECHNOLOGY (SHENZHEN) COMPANY LIMITED, Shenzhen (CN)

(72) Inventors: Jingfan Zhang, Shenzhen (CN); Shuai Wang, Shenzhen (CN); Qinqin Zhou, Shenzhen (CN); Jiali Peng, Shenzhen (CN); Zhaoxiang Li, Shenzhen (CN); Lingzhu Xiang, Shenzhen (CN); Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 121 days.

(21) Appl. No.: 18/637,606

(22) Filed: Apr. 17, 2024

(65) Prior Publication Data

US 2024/0261967 A1 Aug. 8, 2024

Related U.S. Application Data

(63) Continuation of application No. PCT/CN2023/095720, filed on May 23, 2023.

(30) Foreign Application Priority Data

Jul. 25, 2022 (CN) ........................ 202210877962.X

(51) Int. Cl.

| | |
|---|---|
| ***B25J 9/16*** | (2006.01) |
| ***B25J 17/00*** | (2006.01) |
| ***B62D 57/032*** | (2006.01) |

(52) U.S. Cl.
CPC ........... *B25J 9/1664* (2013.01); *B25J 9/1633* (2013.01); *B25J 17/00* (2013.01); *B62D 57/032* (2013.01)

(58) Field of Classification Search
None
See application file for complete search history.

(56) References Cited

U.S. PATENT DOCUMENTS

| | | | | |
|---|---|---|---|---|
| 6,401,846 | B1 * | 6/2002 | Takenaka ............. | B62D 57/032 901/1 |
| 9,440,353 | B1 * | 9/2016 | da Silva ................. | B25J 9/1633 |

(Continued)

FOREIGN PATENT DOCUMENTS

| | | | |
|---|---|---|---|
| CN | 108791561 | A | 11/2018 |
| CN | 109501881 | A | 3/2019 |

(Continued)

OTHER PUBLICATIONS

Abderrahmane Kheddar, Humanoid robots in aircraft manufacturing, IEEE Robotics & Automation Magazine, 2019 (Year: 2019).*

(Continued)

*Primary Examiner* — Arslan Azhar
(74) *Attorney, Agent, or Firm* — Anova Law Group, PLLC

(57) ABSTRACT

A swing-up motion method of a robot includes: receiving a swing-up motion instruction; controlling, in response to the swing-up motion instruction, first leg parts of a robot to be in a suspended state, performing a leg retraction movement of the first leg parts, and at the end of the suspended state, placing first mechanical wheels on knee joints of the first leg parts on the ground; and controlling second leg parts of the robot to be suspended and keeping stable in a balanced state by using the first mechanical wheels as force-bearing balance points.

20 Claims, 17 Drawing Sheets

(56) References Cited

U.S. PATENT DOCUMENTS

| | | | | |
|---|---|---|---|---|
| 2011/0067521 | A1* | 3/2011 | Linn | B25J 15/0009 74/490.06 |
| 2011/0298309 | A1* | 12/2011 | Kim | B25J 17/0241 310/17 |
| 2021/0039253 | A1 | 2/2021 | Whitman et al. | |
| 2022/0242506 | A1* | 8/2022 | Bae | B62D 57/028 |
| 2022/0274657 | A1 | 9/2022 | Zhang et al. | |
| 2023/0264356 | A1 | 8/2023 | Jiang et al. | |
| 2024/0017404 | A1 | 1/2024 | Chen et al. | |

FOREIGN PATENT DOCUMENTS

| | | | | | |
|---|---|---|---|---|---|
| CN | 111300451 | A | | 6/2020 | |
| CN | 112776915 | A | * | 5/2021 | B62D 57/028 |
| CN | 112874651 | A | | 6/2021 | |
| CN | 112874652 | A | * | 6/2021 | B62D 57/028 |
| CN | 113031639 | A | | 6/2021 | |
| CN | 113220004 | A | | 8/2021 | |
| CN | 113618750 | A | | 11/2021 | |
| CN | 113753146 | A | | 12/2021 | |
| CN | 113978568 | A | | 1/2022 | |
| CN | 114401887 | A | | 4/2022 | |
| CN | 114454983 | A | | 5/2022 | |
| JP | H0679657 | A | | 3/1994 | |
| JP | H10202562 | A | | 8/1998 | |
| JP | 2004066381 | A | | 3/2004 | |
| JP | 2006082142 | A | | 3/2006 | |
| WO | 2022007499 | A1 | | 1/2022 | |

OTHER PUBLICATIONS

The World Intellectual Property Organization (WIPO) International Search Report for PCT/CN2023/095720 Sep. 20, 2023 7 Pages (including translation).

Robotic Systems Lab: Legged Robotics at ETH Zürich, "The Future of Robotic Mobility", www.youtube.com/watch?v=RJyhZUqj3hM&t=2s.

The European Patent Office (EPO) The Extended European Search Report for Application No. 23845020.9 Nov. 19, 2024 5 Pages.

Nrk Intelligence: "Tencent's New Robotic Dog Max Has Wheels On Its Legs, Can Travel At 25KM/Hour | Nrk Intelligence", Jun. 20, 2021 (Jun. 20, 2021), https://www.youtube.com/watch?v=ZIWVmpB5dD0.

China National Intellectual Property Administration (CNIPA) Office Action 1 for Application No. 202210877962.X Mar. 22, 2025 11 Pages (including translation).

The Japan Patent Office (JPO) Notice of Reasons for Refusal for Application No. 2024-563952 Nov. 4, 2025 6 Pages (including translation).

* cited by examiner

SWING-UP MOTION METHOD AND APPARATUS OF ROBOT, ROBOT, AND STORAGE MEDIUM

CROSS-REFERENCES TO RELATED APPLICATIONS

This application is a continuation application of PCT Patent Application No. PCT/CN2023/095720, filed on May 23, 2023, which claims priority to Chinese Patent Application No. 202210877962. X, filed on Jul. 25, 2022 and entitled "SWING-UP MOTION METHOD AND APPARATUS OF ROBOT, ROBOT, STORAGE MEDIUM, AND PRODUCT", both of which are incorporated herein by reference in their entirety.

FIELD OF THE TECHNOLOGY

Embodiments of the present disclosure relate to the field of robots, and in particular, to a swing-up motion method and apparatus of a robot, a robot, a storage medium, and a product.

BACKGROUND OF THE DISCLOSURE

With continuous development of robotic technologies, capabilities of robots are increasingly extensive. Different types of robots are able to adapt to diverse working environments and execute different operational tasks based on operational instructions.

In the related art, to adapt to more scenarios, a quadruped robot is usually used to handle various daily tasks, and the robot is transitioned from quadruped to biped by a swinging/standing up motion to meet requirements in biped and quadruped application scenarios. For example, hind legs of the quadruped robot move forward quickly, to enable forelegs to leave the ground, and posture adjustment is performed during a swing-up process to implement a bipedal balanced state.

During the foregoing swing-up process, space for the robot needs to be large enough to implement a motion process of the hind legs moving forward quickly. In other words, an area for movement needs to be large enough to allow the robot to implement the swing-up process. When the robot is in narrow space, the robot is unable to transition to the bipedal balanced state by the foregoing process. This greatly limits the application scenarios of the robot.

SUMMARY

Embodiments of the present disclosure provide a swing-up motion method and apparatus of a robot, a robot, a storage medium, and a product, to avoid performing a swing-up process only by an inertial motion of feet and effectively resolve a problem of requiring a large operating area by controlling first leg parts to perform a leg retraction movement in a suspended state and using first mechanical wheels as on-ground support components after the legs are retracted, when an area allowing for movement of legs of a robot is small. The technical solutions are as follows.

According to an aspect, a swing-up motion method of a robot is provided. The robot includes legs and a main body part connected to the legs. The legs each include a bendable knee joint. The knee joint includes a mechanical wheel. The legs include first leg parts and second leg parts, and the second leg parts and the first leg parts are arranged in order in a swing-up direction of the robot. The method includes: receiving a swing-up motion instruction; controlling, in response to the swing-up motion instruction, the first leg parts of the robot to be in a suspended state, performing a leg retraction movement of the first leg parts, and at the end of the suspended state, placing first mechanical wheels on knee joints of the first leg parts on an operating plane; and controlling the second leg parts of the robot to be suspended and keeping stable in a balanced state, by using the first mechanical wheels as force-bearing balance points.

According to another aspect, a swing-up motion apparatus of a robot is provided. The robot includes legs and a main body part connected to the legs. The legs each include a bendable knee joint. The knee joint includes a mechanical wheel. The legs include first leg parts and second leg parts. The first leg parts and the second leg parts are arranged in order in a swing-up direction of the robot. The swing-up is for indicating a transition of a balanced state of the robot by changing a contact state with an operating plane.

The apparatus includes: an instruction receiving module, configured to receive a swing-up motion instruction; a first control module, configured to control, in response to the swing-up motion instruction, the first leg parts of the robot to be in a suspended state, perform a leg retraction movement of the first leg parts, and at the end of the suspended state, place first mechanical wheels on knee joints of the first leg parts on an operating plane; and a second control module, configured to control the second leg parts of the robot to be suspended and keep stable in a balanced state, by using the first mechanical wheels as force-bearing balance points, the force-bearing balance points being used during a swing-up motion process.

According to another aspect, a robot is provided. The robot includes a processor and a memory. The memory has at least one instruction, at least one program, a code set, or an instruction set stored thereon. The at least one instruction, the at least one program, the code set, or the instruction set is loaded and executed by the processor to implement the swing-up motion method of a robot according to any one of embodiments of the present disclosure.

According to another aspect, a non-transitory computer-readable storage medium is provided. The storage medium has at least one instruction, at least one program, a code set, or an instruction set stored thereon. The at least one instruction, the at least one program, the code set, or the instruction set is loaded and executed by a processor to implement the swing-up motion method of a robot according to any one of embodiments of the present disclosure.

The technical solutions provided in embodiments of the present disclosure have at least the following beneficial effects.

In a robot that needs to perform a swing-up motion, legs include bendable knee joints, and the knee joints correspondingly include mechanical wheels. After a swing-up motion instruction is received, first leg parts of the robot are controlled to be in a suspended state, a leg retraction movement of the first leg parts is performed, at the end of the suspended state, first mechanical wheels on knee joints of the first leg parts are placed on an operating plane, and second leg parts of the robot are controlled to be suspended, to implement a swing-up process. When an area allowing for movement of legs of the robot is small, the suspended state and the leg retraction movement in the suspended state enable the robot to use the first mechanical wheels as on-ground support components after the legs are retracted in the suspended state, instead of always using feet as on-ground support components, to avoid performing a swing-up process only by an inertial motion of feet, thereby effectively resolving a problem of requiring a large operating area. In addition, implementing the leg retraction movement in a suspended state can also avoid a problem of complicated operations when lower legs are used for support, thereby simplifying an operating process during the swing-up action of robot, and improving efficiency of the swing-up motion.

DESCRIPTION OF EMBODIMENTS

Figure 1:
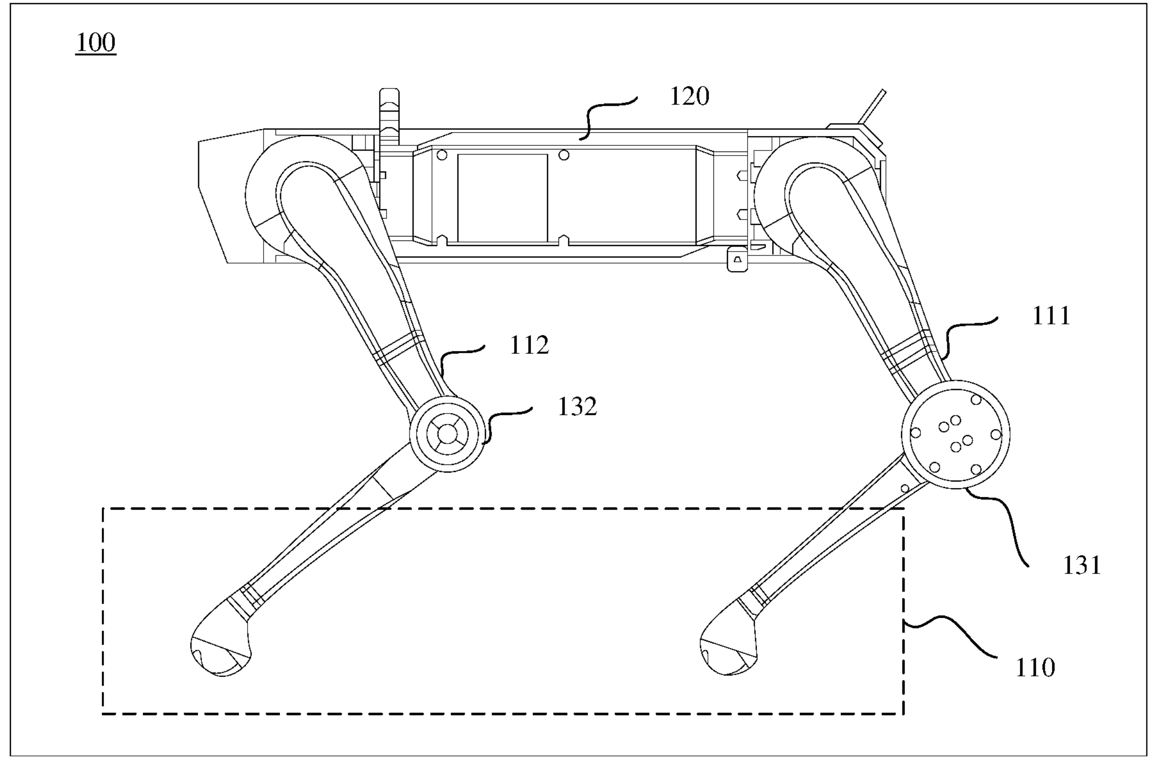
FIG. 1 is a schematic side-view diagram of a structure of a quadruped robot dog according to an exemplary embodiment of the present disclosure.

In embodiments of the present disclosure, a swing-up motion method of a robot is provided, to avoid performing a swing-up process only by an inertial motion of feet and effectively resolve a problem of requiring a large operating area by controlling first leg parts to perform a leg retraction movement in a suspended state and using first mechanical wheels as on-ground support components after the legs are retracted, when an area allowing for movement of legs of a robot is small. The swing-up motion method of a robot trained in the present disclosure is applicable in at least one of scenarios of operating the robot on a flat surface and operating the robot on a pile surface.

The foregoing application scenarios are only examples. The swing-up motion method of a robot provided in the embodiments is also applicable to another scenario. This is not limited in embodiments of the present disclosure.

Information (including but not limited to user equipment information, user personal information, and the like), data (including but not limited to data used for analysis, stored data, displayed data, and the like), and any signal involved in the present disclosure are all authorized by a user or authorized by all parties in full. Collection, use, and processing of relevant data need to comply with relevant laws, regulations, and standards of relevant regions. For example, data involved in controlling the robot in the present disclosure are all obtained with full authorization.

In one embodiment, the foregoing robot that implements the swing-up motion method is a bipedal robot. In other words, when operating in a bipedal state, the robot implements motion control based on two legs. After completing a swing-up action, the robot is implemented in a single-legged state. When operating in the single-legged state, a robot dog implements motion control based on a single leg.

In one embodiment, the foregoing robot that implements the swing-up motion method is a tripod robot. In other words, when operating in a tripod state, the robot implements motion control based on three legs. After completing a swing-up action, the robot is in a single-legged state or a bipedal state. For example, when the robot is implemented in the single-legged state, a robot dog implements motion control based on a single leg. For example, a contact area between a foot of a biped robot and an operating plane is large enough to support the robot to stand in a single-legged state. Alternatively, when the robot is implemented in a bipedal state, a robot dog implements motion control based on two legs.

In embodiments of the present disclosure, an example in which a robot is implemented as a quadruped robot dog is used for description. To be specific, the robot dog correspondingly includes four wheels for locomotion. The four wheels are respectively connected to legs and are connected to a main body part via the legs. During operating in a quadruped state, the robot dog implements motion control based on four legs. In one embodiment, after completing a swing-up process, the robot is in a bipedal state. When operating in the bipedal state, the robot dog implements motion control based on two legs.

The robot in the present disclosure is not limited to the foregoing structure. According to assembly of a multi-legged robot, a robot that can implement a swing-up motion process is used as the robot in embodiments of the present disclosure.

For example, FIG. 1 is a schematic side-view diagram of a structure of a quadruped robot dog 100 according to an exemplary embodiment of the present disclosure. As shown in FIG. 1, the quadruped robot dog 100 includes legs 110 and a main body part 120 connected to the legs 110. The legs 110 include first leg parts 111 and second leg parts 112. An arrangement order of the first leg part 111 and the second leg part 112 is fixed. In one embodiment, the second leg part 112 and the first leg part 111 are arranged in order in a swing-up direction of the quadruped robot dog 100. For example, the first leg part 111 is referred to as a hind leg of the quadruped robot dog 100, and the second leg part 112 is referred to as a foreleg of the quadruped robot dog 100. When the quadruped robot dog 100 performs a swing-up process, the second leg parts 112 are lifted, and the first leg parts 111 are used as support legs after a swing-up action, so that the quadruped robot dog 100 transitions from a quadruped balanced state to a bipedal balanced state. In addition, the legs 110 further include bendable knee joints. For example, the first leg parts 111 each include a bendable first knee joint 131, and the second leg parts 112 each include a bendable second knee joint 132. The knee joints each include a mechanical wheel. For example, the first knee joints 131 corresponding to the first leg parts 111 each include a first mechanical wheel; and the second knee joints 132 corresponding to the second leg parts 112 each include a second mechanical wheel.

Figure 2:
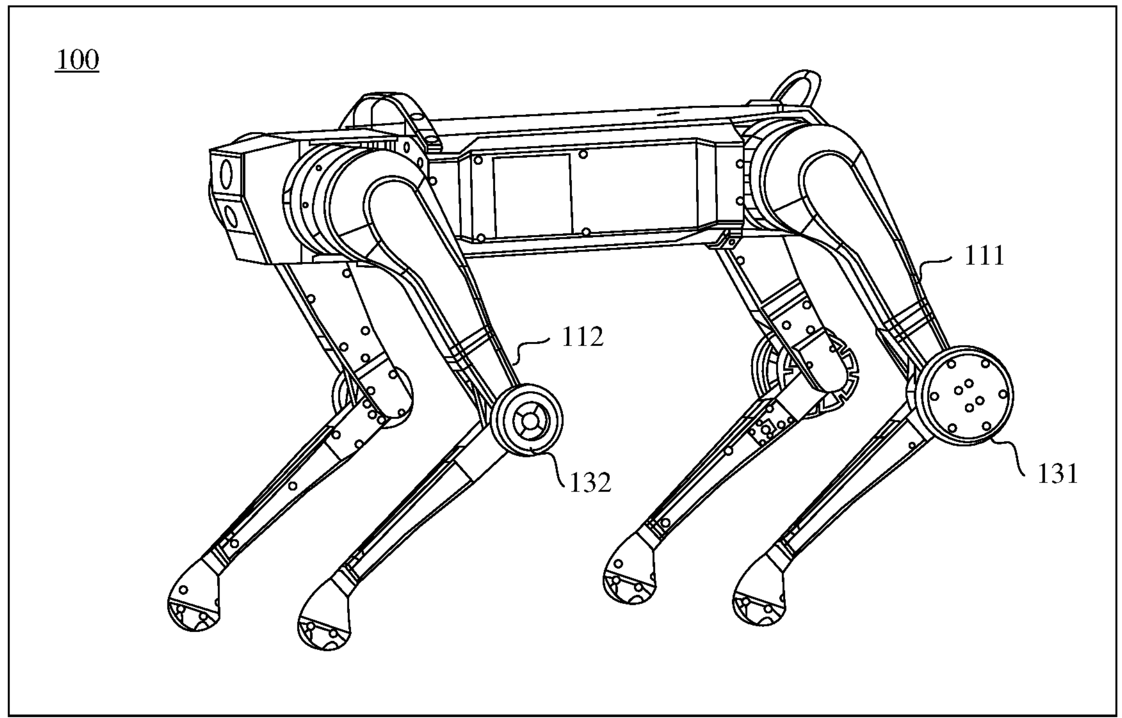
FIG. 2 is a schematic diagram of a structure of a quadruped robot dog in oblique front view according to an exemplary embodiment of the present disclosure.

For example, FIG. 2 is a schematic diagram of a structure of a quadruped robot dog 100 in oblique front view according to an exemplary embodiment of the present disclosure. The quadruped robot dog 100 includes legs and a main body part connected to the legs. The legs include two first leg parts 111 and two second leg parts 112. Each first leg part 111 includes a bendable first knee joint 131, and each second leg part 112 further includes a bendable second knee joint 132. The first knee joint 131 correspondingly includes a first mechanical wheel, and the second knee joint 132 correspondingly includes a second mechanical wheel. In one embodiment, in the foregoing FIG. 1 and FIG. 2, when performing the swing-up motion method provided in embodiments of the present disclosure, the quadruped robot dog 100 transitions from a state in which feet corresponding to the first leg parts 111 are placed on the ground to a state in which the first mechanical wheels corresponding to the first leg parts 111 are placed on an operating plane. In other words, after a swing-up motion process is implemented, the first mechanical wheels corresponding to the first leg parts 111 are brought into contact with the operating plane, so that the first mechanical wheels are used as force-bearing balance points.

Figure 3:
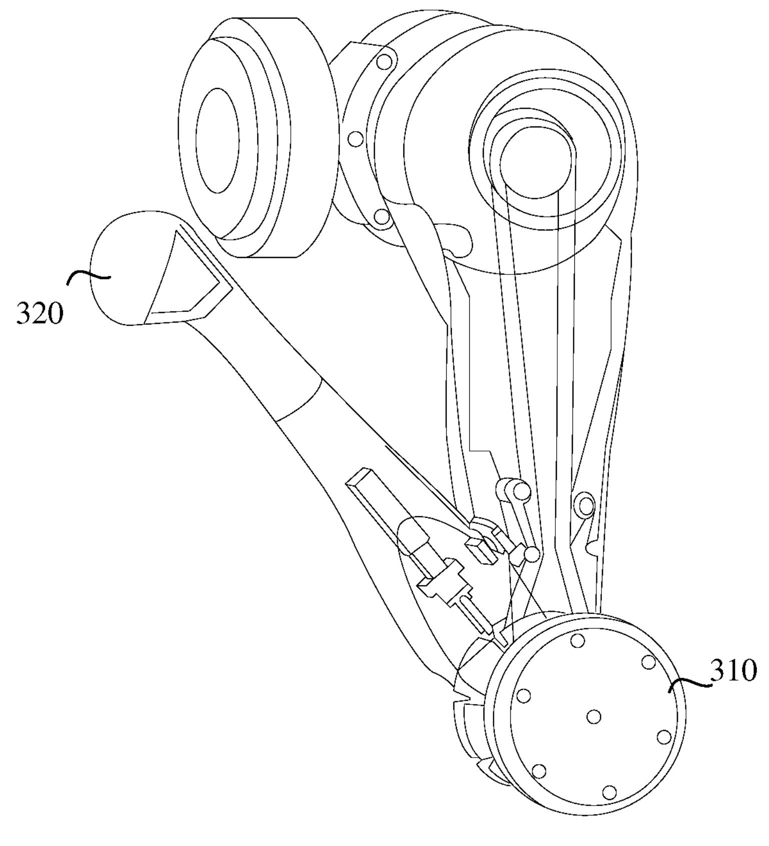
FIG. 3 is a schematic diagram of placing a first mechanical wheel on the ground according to an exemplary embodiment of the present disclosure.

For example, FIG. 3 is a partially enlarged diagram of a first leg part when a first mechanical wheel 310 is used as a force-bearing balance point. The first mechanical wheel 310 is configured to maintain a balanced state of a quadruped robot dog completing a swing-up motion.

Figure 4:
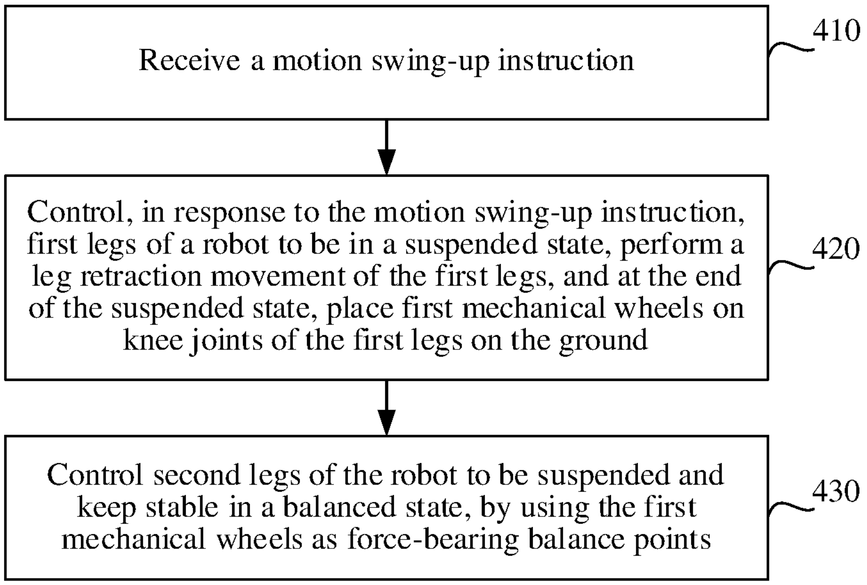
FIG. 4 is a flowchart of a swing-up motion method of a robot according to an exemplary embodiment of the present disclosure.

A swing-up motion method of a robot provided in embodiments of the present disclosure is introduced in combination with the foregoing content. FIG. 4 is a flowchart of a swing-up motion method of a robot provided in an embodiment of the present disclosure. The method may be implemented by a microprocessor of the robot. As shown in FIG. 4, the method includes the following step 410 to step 430.

Step 410: Receive a swing-up motion instruction.

For example, the swing-up motion instruction is used for controlling the robot to perform a swing-up motion process. The swing-up motion refers to a swing-up action of the robot, to transition the robot from a balanced state to a standing state by changing a contact state between the robot and an operating plane. In some embodiments, the operating plane may be the plane that the robot stands/moves on, such as the ground plane.

For example, the standing state refers to a state in which first leg parts of the robot are placed on the operating plane, second leg parts are suspended, and a main body part of the robot is upright.

In one embodiment, the changing a contact state between the robot and an operating plane includes transitioning from a state in which both the first leg parts and the second leg parts of the robot are in contact with the operating plane to a state in which only the first leg parts of the robot are placed on the operating plane; or transitioning from a state in which both the first leg parts and the second leg parts of the robot are in contact with the operating plane to a state in which only the second leg parts of the robot are placed on the operating plane; or first transitioning from a state in which both the first leg parts and the second leg parts of the robot are in contact with the operating plane to a state in which only the second leg parts of the robot are placed on the operating plane, then to a state in which only the first leg parts of the robot are placed on the operating plane.

For example, the operating plane refers to a plane where the legs of the robot move during the swing-up motion process of the robot. For example, when the robot performs the swing-up motion on the ground, the ground is the operating plane. Alternatively, when the robot performs the swing-up motion on a desk, the desk is the operating plane.

In one embodiment, the robot is a quadruped robot dog, and an operating state of the quadruped robot dog is that four feet are in contact with the operating plane. In other words, the quadruped robot dog is supported by four legs during movement and maintains a first balanced state when supported by the four feet. In response to that the quadruped robot dog receives the swing-up motion instruction, the quadruped robot dog is controlled based on the swing-up motion instruction to change an on-ground state of the four feet in contact with the operating plane, to allow at least one leg to leave the operating plane and enter a second balanced state that is different from the first balanced state. For example, in response to receiving the swing-up motion instruction, the quadruped robot dog controls, based on the swing-up motion instruction, two legs of the quadruped robot dog to leave the operating plane, so that the quadruped robot dog enters the second balanced state that is different from the first balanced state.

Step 420: Control, in response to the swing-up motion instruction, the first leg parts of the robot to be in a suspended state, perform a leg retraction movement of the first leg parts, and at the end of the suspended state, place first mechanical wheels on knee joints of the first leg parts on the operating plane.

For example, in response to receiving the swing-up motion instruction, the first leg parts and the second leg parts of the robot are controlled to perform the swing-up motion process. In one embodiment, based on the swing-up motion instruction, the robot adjusts a motion state of each first leg part, to enable the first leg part to be in a suspended state. For example, the first leg part correspondingly includes a first knee joint that performs a bending movement. Bending of the first leg part can be adjusted by controlling output torque of the first knee joint. For example, a bending angle of the first leg part is increased; or a bending angle of the first leg part is decreased; or a bending angle of the first leg part remains unchanged.

For example, based on the swing-up motion instruction, the robot is controlled to adjust the output torque of the first knee joint corresponding to the first leg part, to increase the corresponding bending angle of the first leg part until the first leg part is in the suspended state.

In one embodiment, the second leg part also correspondingly includes a second knee joint that performs a bending movement. Bending of the second leg part can be adjusted by controlling output torque of the second knee joint.

For example, based on the swing-up motion instruction, the robot is controlled to adjust the output torque of the first knee joints corresponding to the first leg parts, to increase the corresponding bending angles of the first leg parts. In addition, the robot is controlled to adjust torque of the second knee joints corresponding to the second leg parts, to decrease corresponding bending angles of the second leg part, until the first leg part is in the suspended state.

In one embodiment, a connecting part between the main body part of the robot and each first leg part correspondingly includes a first leg joint, and the first leg joint is configured to control a thigh part of the first leg part. During adjusting the motion state of each first leg part based on the swing-up motion instruction, output torque of the first leg joint is controlled to control the thigh part of the first leg part to bend. For example, a bending angle between the first leg part and the main body part is increased; or a bending angle between the first leg part and the main body part is decreased.

In one embodiment, when the first leg part is in the suspended state, the leg retraction movement of the first leg part is performed.

The leg retraction movement refers to a movement for decreasing the bending angle of the first leg part. The bending angle refers to an included angle between a first upper leg part and a first lower leg part connected to the first knee joint in each first leg part. For example, the output torque of the first knee joint corresponding to the first leg part is controlled to decrease the bending angle of the first leg part, to implement a leg retraction process of the first leg part.

The suspended state refers to a state in which a leg part (e.g., the second leg part) leaves the operating plane of the robot, that is, a state in which the leg part is not in contact with the operating plane. For example, an end of the first leg part is connected to the main body part of the robot, and the other end of the first leg part is referred to as a first foot. A state in which the first foot leaves the operating plane (e.g., hanging in the air instead of contacting a ground plane where the robot operates) is referred to as the foregoing suspended state.

In one embodiment, when the first leg part is in the suspended state, in other words, when the first foot leaves the operating plane, output torque of the first knee joint corresponding to the first leg part is controlled to decrease the bending angle of the first leg part. For example, after the first foot leaves the operating plane, an operating current of the first leg part corresponding to the first foot decreases rapidly. In response to a signal indicating that the current is decreased, the output torque of the first knee joint corresponding to the first leg part is controlled, to implement the leg retraction process of the first leg part.

In one embodiment, at the end of the suspended state, the first mechanical wheel on the knee joint of the first leg part is placed on the ground.

In one embodiment, after the leg retraction movement of the first leg part is completed, the first mechanical wheel on the knee joint of the first leg part is placed on the ground. Alternatively, during the leg retraction movement of the first leg part, the first mechanical wheel on the knee joint of the first leg part is placed on the ground. In other words, after the first mechanical wheel at the knee joint of the first leg part is placed on the ground, the leg retraction movement of the first leg part is continued.

Step 430: Control the second leg parts of the robot to be suspended and keep stable in a balanced state, by using the first mechanical wheels as force-bearing balance points.

The force-bearing balance point refers to a force-bearing point that supports the robot to adjust a motion posture and/or movement parameters of the robot to reach a balanced state during the swing-up motion of the robot.

The motion posture refers to a posture when the robot performs the swing-up motion. The movement parameters refer to joint parameters respectively corresponding to the legs and the main body part of the robot during the swing-up motion process. For example, torque values of the first knee joints in the first leg parts during the swing-up motion process.

In one embodiment, after the first mechanical wheel falls on the operating plane of the robot, a contact point between the first mechanical wheel and the operating plane is used as the force-bearing balance point. For example, a force-bearing situation during attempting to achieve or maintaining the balanced state is determined by using the force-bearing balance point. During controlling the second leg part of the robot to be suspended, the first mechanical wheel is used as the force-bearing balance point to assist a suspension process of the second leg part, to implement the suspended state of the second leg part of the robot. For example, after the first mechanical wheel falls on the operating plane, the first mechanical wheel is used as the force-bearing balance point to adjust rotation of the first mechanical wheel, to control stability of the robot. For example, when the main body part of the robot tends to lean backward, the first mechanical wheel is rotated forward slightly; and when the main body part of the robot tends to lean forward, the first mechanical wheel is rotated backward slightly, to enable the main body part of the robot to enter a stable balanced state.

Figure 5:
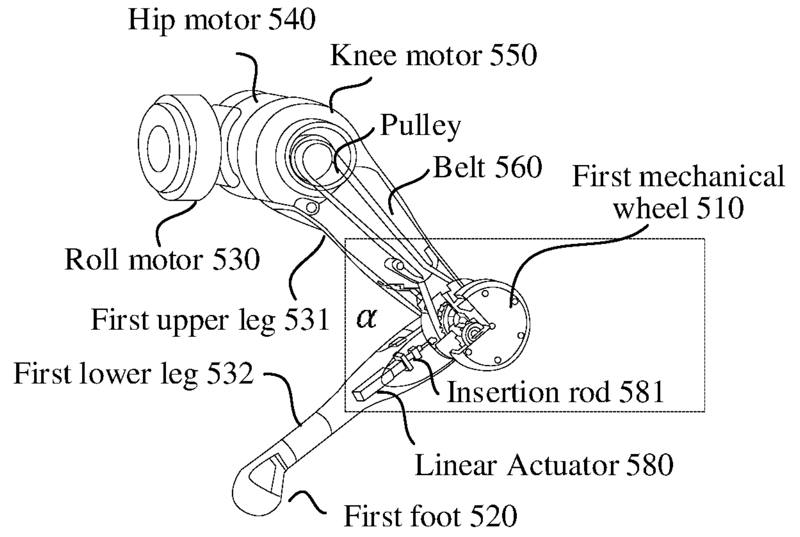
FIG. 5 is a schematic diagram of a structure of a first leg part according to an exemplary embodiment of the present disclosure.

For example, FIG. 5 is a schematic diagram of a first leg part of a robot before a swing-up motion is performed, and includes a first mechanical wheel 510 corresponding to a first knee joint. A first foot 520 corresponding to the first leg part is used as a force-bearing balance point before the robot performs the swing-up motion. For example, FIG. 3 is a schematic diagram of a first leg part of a robot after a swing-up motion is performed, and includes a first mechanical wheel 310 corresponding to a first knee joint. After the swing-up motion is performed, at the end of a suspended state of the first leg part, the first mechanical wheel 310 at a knee joint of the first leg part is placed on the ground, and the first mechanical wheel 310 corresponding to the first leg part is used as a force-bearing balance point after the robot performs the swing-up motion. In other words, a first foot 320 is no longer used as a force-bearing balance point after the robot performs the swing-up motion. The force-bearing balance point is related to a contact point between the first leg part of the robot and an operating plane. In one embodiment, a motion allowed region for each first leg part is determined. The motion allowed region refers to a region where the first leg part is located on the operating plane during the swing-up motion of the robot.

For example, when the robot performs a motion on discontinuously distributed quincuncial piles, and the motion allowed region is a pile surface region corresponding to a quincuncial pile. When the robot performs the swing-up motion, the corresponding first leg parts of the robot are within pile surface regions.

In one embodiment, the motion allowed region is used as an operating plane support range for the first mechanical wheel during a first upper leg part and a first lower leg part performing a leg retraction movement. The operating plane support range refers to a range that can support a motion of the first mechanical wheel on the operating plane.

In one embodiment, the robot is provided with an image acquisition device. For example, a camera configured for image acquisition is provided on the head of the robot. Alternatively, a micro camera is used as an eye of the robot to acquire images while the robot is operating. Alternatively, the image acquisition device is provided at each of different joints of the robot to acquire images around the joints when different joints are operating.

In one embodiment, the motion allowed region is determined by using the image acquisition device. For example, the image acquisition device acquires ambient images around and sends a plurality of acquired ambient images to a corresponding processor of the robot. The processor determines the motion allowed region corresponding to the first leg part based on the plurality of ambient images.

For example, the first foot connected to the first leg part is located on a quincuncial pile A. During a swing-up operation of the robot, the image acquisition device acquires a plurality of ambient images and sends the plurality of ambient images to the processor. The processor performs recognition on the plurality of ambient images and recognizes ambient images corresponding to the first leg part. For example, the quincuncial pile A where the first leg part is located is recognized, and the quincuncial pile A is used as the foregoing motion allowed region.

In one embodiment, the processor sends to a corresponding joint motor the motion allowed region obtained via an image recognition process, so that the corresponding joint motor controls output torque to control the first mechanical wheel to fall within the motion allowed region.

In one embodiment, the robot is provided with a joint position processing device for memorizing and adjusting positions of different joints. For example, in response to that the robot receives a swing-up motion instruction, the first knee joint memorizes current position information and uses the position information as position information corresponding to the motion allowed region. When the first leg part corresponding to the first knee joint completes a leg retraction movement, the first knee joint adjusts, based on the position information determined by memory, the first mechanical wheel to fall within the motion allowed region corresponding to the position information. In other words, after the motion allowed region is determined, during the first leg part performing the leg retraction movement, the motion allowed region is used as an operating plane support range for the first machine wheel on the first leg part, to ensure that the robot can perform the leg retraction movement in regions of different sizes, thereby expanding application scenarios in which the robot can perform a swing-up motion.

In one embodiment, the robot includes first leg joints, the first leg joints being configured to control torque of the first upper leg parts. For example, during the first upper leg part and the first lower leg part performing the leg retraction movement of the first leg part, torque of the first leg joint is controlled to adjust an included angle between the first upper leg part and a horizontal plane, to enable the first mechanical wheel to fall within the motion allowed region. In one embodiment, a contact point between the first mechanical wheel and the motion allowed region is used as the force-bearing balance point in response to that the first mechanical wheel falls within the motion allowed region.

For example, after second leg parts of the robot are controlled to be suspended, stability of the robot is adjusted by adjusting rotation of the first mechanical wheels on the operating plane, to keep the robot stable in a balanced state. For example, when a main body part of the robot stops shaking, it is determined that the robot completes the swing-up process and enters the balanced state. Alternatively, when shaking amplitudes of the main body part and the first upper leg parts connected to the first mechanical wheels of the robot are less than a preset shaking amplitude, it is determined that the robot completes the swing-up process and enters the balanced state. In other words, during the leg retraction movement, the torque of the first leg joint is controlled to adjust an included angle between the first upper leg part and the horizontal plane, to enable the first mechanical wheel to fall within the motion allowed region, so that the contact point between the first mechanical wheel and the motion allowed region is used as the force-bearing balance point. This ensures that a position of the force-bearing balance point is within the motion allowed region, thereby avoiding occupation of an excessive large contact area during the swing-up motion of the robot.

Figure 6:
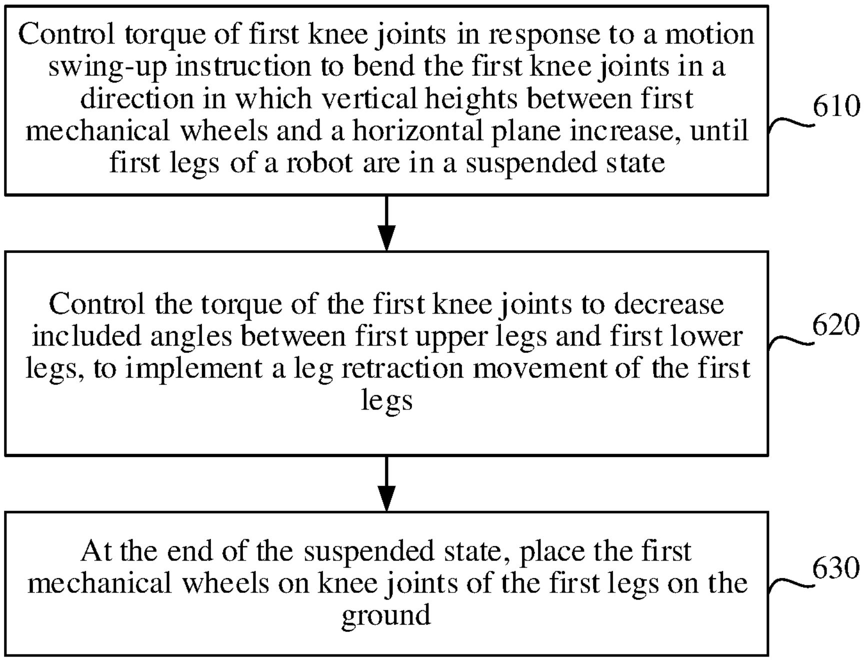
FIG. 6 is a flowchart of a swing-up motion method of a robot according to another exemplary embodiment of the present disclosure.

In one embodiment, the first leg parts each include a bendable first knee joint, and a process of placing the first mechanical wheels on knee joints of the first leg parts of the robot on the ground is implemented by using the first knee joints. For example, as shown in FIG. 6, step 420 in the foregoing embodiment shown in FIG. 4 may alternatively be implemented as the following steps 610 to 630.

Step 610: Control torque of first knee joints in response to a swing-up motion instruction to bend the first knee joints in a direction in which vertical heights between first mechanical wheels and a horizontal plane increase, until first leg parts of a robot are in a suspended state.

For example, in response to receiving the swing-up motion instruction, the torque of the first knee joints is controlled to increase the vertical heights between the first mechanical wheels and the horizontal plane. For example, before the swing-up motion instruction is received, the vertical heights between the first mechanical wheels corresponding to the first knee joints and the horizontal plane are 80 cm. After the swing-up motion instruction is received, the torque of the first knee joints is controlled to increase the vertical heights between the first mechanical wheels and the horizontal plane. For example, in response to receiving the swing-up motion instruction, the torque of the first knee joints is controlled to gradually increase the vertical heights between the first mechanical wheels and the horizontal plane to 100 cm.

For example, the horizontal plane refers to a plane parallel to an operating plane.

In one embodiment, the horizontal plane is higher than the operating plane, or the horizontal plane is lower than the operating plane, or the horizontal plane is at the same height as the operating plane. For example, the horizontal plane is the operating plane. For another example: the horizontal plane is parallel to the operating plane and lower than the operating plane.

When the vertical heights between the first mechanical wheels and the horizontal plane are increased, the first knee joints are bent in the direction in which the vertical heights between the first mechanical wheels and the horizontal plane increase, so that bending angles of the first leg parts are increased.

In one embodiment, the first leg parts each include a first upper leg part and a first lower leg part, the first upper leg part and the first lower leg part are connected by a first knee joint, and the first upper leg part is connected to a main body part.

For example, FIG. 5 is a schematic diagram of a first leg part of a robot before a swing-up motion is performed. The first leg part includes a first upper leg part 531 and a first lower leg part 532. In addition, the first upper leg part 531 and the first lower leg part 532 are connected by a first knee joint. A first mechanical wheel 510 is correspondingly provided on the first knee joint. A process of increasing a bending angle of the first leg part is: increasing an included angle α between the first upper leg part 531 and the first lower leg part 532.

In one embodiment, during bending the first knee joints in the direction in which the vertical heights between the first mechanical wheels and the horizontal plane increase, bending angles of second leg parts are decreased until the first leg parts of the robot are in a suspended state.

In one embodiment, in response to that the bending angles of the first leg parts reach a preset bending angle threshold, the torque of the first knee joints is controlled to decrease included angles between the first upper leg parts and the first lower leg parts, to implement a leg retraction movement of the first leg parts.

Step 620: Control the torque of the first knee joints to decrease the included angles between the first upper leg parts and the first lower leg parts, to implement the leg retraction movement of the first leg parts.

For example, when the first leg parts are in the suspended state, the torque of the first knee joints is controlled to control the first lower leg parts is controlled by controlling the torque of the first knee joint, so that the first lower leg parts approach the first upper leg parts to decrease the included angles between the first upper leg parts and the first lower leg parts, so as to implement the leg retraction movement of the first leg parts. Alternatively, when the first leg parts are in the suspended state, the torque of the first knee joints is controlled to control both the first upper leg parts and the first lower leg parts, to make the first lower leg parts be in close contact with the first upper leg parts, so that the included angles between the first upper leg parts and the first lower leg parts are decreased, and the leg retraction movement of the first leg parts is implemented.

In one embodiment, the first upper leg part is provided with a first magnetic component, the first lower leg part is provided with a second magnetic component, and a magnetic matching relationship exists between the first magnetic component and the second magnetic component.

The magnetic matching relationship indicates that corresponding magnetic parts of the first magnetic component and the second magnetic component attract each other.

In one embodiment, the first magnetic component provided on the first upper leg part is implemented as a magnet, and the second magnetic component provided on the first lower leg part is implemented as a metal substance that can be attracted by a magnet, such as a metal substance containing iron, nickel, or cobalt. Because the magnet has a magnetic relationship with the metal substance, the magnetic matching relationship exists between the first magnetic component and the second magnetic component.

In one embodiment, the first magnetic component provided on the first upper leg part is implemented as a positive pole/north pole (N pole) of the magnet, and the second magnetic component provided on the first lower leg part is implemented as a negative pole/south pole (S pole) of the magnet. Alternatively, the first magnetic component provided on the first upper leg part is implemented as S pole, and the second magnetic component provided on the first lower leg part is implemented as N pole. Because a magnetic relationship between N pole and S pole exists, a magnetic matching relationship exists between the foregoing first magnetic component and the second magnetic component.

In one embodiment, in the suspended state, the torque of the first knee joint is controlled to decrease the included angle between the first upper leg part and the first lower leg part. When the included angle reaches a preset included angle threshold, the first magnetic component provided on the first upper leg part attract the second magnetic component provided on the first lower leg part, to implement the leg retraction movement of the first leg part.

For example, the preset included angle threshold is preset angle data. For example, the preset included angle threshold is 30°. In one embodiment, that the included angle between the first upper leg part and the first lower leg part reaches the preset included angle threshold indicates that the included angle between the first upper leg part and the first lower leg part is less than or equal to the preset included angle threshold. For example, when the included angle between the first upper leg part and the first lower leg part is less than or equal to 30°, a magnetic function of the foregoing magnetic components is triggered, so that the first magnetic component provided on the first upper leg part and the second magnetic component provided on the first lower leg part attract each other, to implement the leg retraction movement of the first leg part.

In one embodiment, when the included angle reaches the preset included angle threshold, the torque of the first knee joint is increased to make the first lower leg part be in close contact with the first upper leg part more quickly, so that the included angle between the first upper leg part and the first lower leg part is decreased, and the leg retraction movement of the first leg part is implemented.

Step 630: At the end of the suspended state, place the first mechanical wheels on the knee joints of the first leg parts on the operating plane.

For example, after the leg retraction movement of the first leg part is completed, the first mechanical wheels on the knee joints of the first leg parts are placed on the ground. Alternatively, during the leg retraction movement of the first leg part, the first mechanical wheel on the knee joint of the first leg part is placed on the ground.

For example, FIG. 3 is a schematic diagram of a first mechanical wheel placed on an operating plane, and includes a first mechanical wheel 310 corresponding to a first knee joint. After the swing-up motion is performed, at the end of the suspended state of the first leg part, a first foot 320 is no longer used as a contact component between the robot and the operating plane, but the first mechanical wheel 310 on the knee joint of the first leg part is placed on the operating plane. In other words, the first mechanical wheel 310 is used as the contact component between the robot and the operating plane, and a subsequent suspension process of the second leg part is performed based on the first mechanical wheel 310.

In this embodiment, in response to receiving the swing-up motion instruction, the torque of the first knee joints of the robot is controlled to bend the first knee joints in the direction in which the vertical heights between the first mechanical wheels and the horizontal plane increase, until the first leg parts are in the suspended state, so as to prevent occupation of an excessive large operating area in a process of enabling the first leg parts to be in a suspended state. In this embodiment, the torque of the first knee joints is controlled to decrease the included angles between the first upper leg parts and the first lower leg parts, to implement the leg retraction movement. In this way, stability during the leg retraction movement is improved while preventing occupation of an excessive large operating area during enabling the first leg parts to be in a suspended state. In this embodiment, the first upper leg part and the first lower leg part are each provided with a magnetic component having a magnetic matching relationship, so that during controlling the torque of the first knee joint to decrease the included angle between the first upper leg part and the first lower leg part, the leg retraction movement of the first leg part is implemented based on attraction between the two magnetic components. This can reduce costs of mutual control and increase convenience of the leg retraction movement and efficiency of implementing the movement.

In this embodiment of the present disclosure, a process of placing the first mechanical wheel on the ground is described. The torque of the first knee joint is controlled in response to the swing-up motion instruction to bend the first knee joints in the direction in which the vertical heights between the first mechanical wheels and the horizontal plane increase, until the first leg parts of the robot are in the suspended state. In the suspended state, the torque of the first knee joints is controlled to decrease the included angles between the first upper leg parts and the first lower leg parts, to implement the leg retraction movement of the first leg part. At the end of the suspended state, the first mechanical wheels on the knee joints of the first leg parts are placed on the ground, to implement the leg retraction process that requires a large region for movement in the suspended state. In addition, the leg retraction process can be implemented more quickly with help of the magnetic components provided on the first upper leg parts and the second lower leg parts, and then the first mechanical wheels corresponding to the first knee joints after the legs are retracted are used as force-bearing balance points for the second leg parts during a swing-up process, to effectively avoid performing a swing-up process only by an inertial motion of feet, thereby practically resolving a problem of requiring a large operating area.

Figure 7:
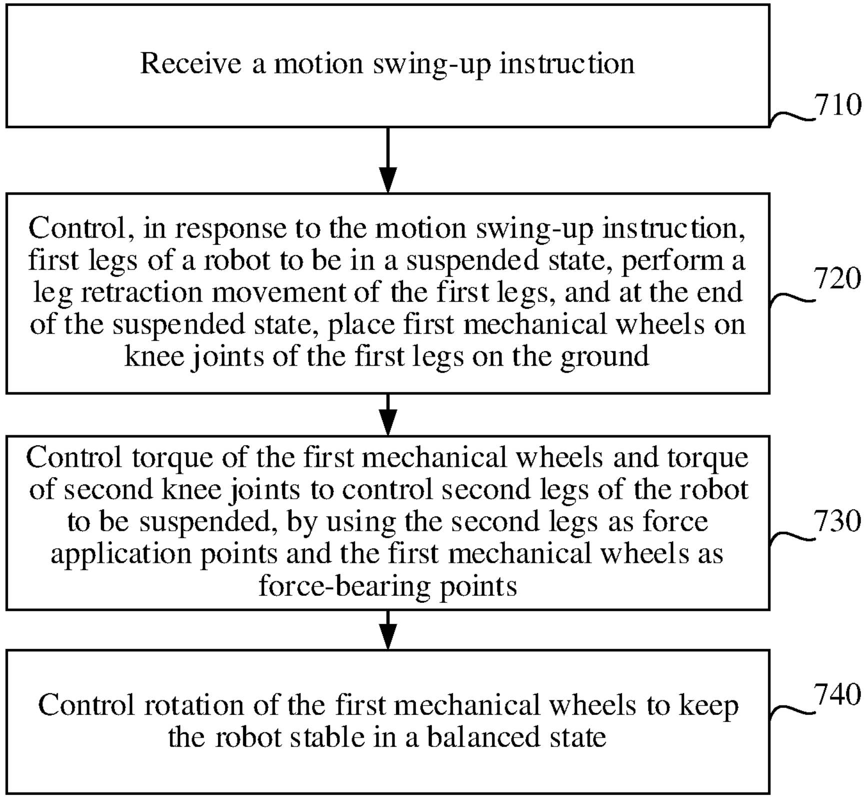
FIG. 7 is a flowchart of a swing-up motion method of a robot according to still another exemplary embodiment of the present disclosure.

In one embodiment, after it is determined that the first mechanical wheel is used as the force-bearing balance point, a suspension process of the second leg part of the robot is implemented with the second leg part and the first leg part of the robot working in conjunction with each other. For example, as shown in FIG. 7, the foregoing embodiment shown in FIG. 4 may alternatively be implemented as the following steps 710 to 740.

Step 710: Receive a swing-up motion instruction.

Content in step 710 is described in step 410. Details are not described herein again.

Step 720: Control, in response to the swing-up motion instruction, first leg parts of a robot to be in a suspended state, perform a leg retraction movement of the first leg parts, and at the end of the suspended state, place first mechanical wheels on knee joints of the first leg parts on the ground.

Part of content in step 720 is described in step 420. Details are not described herein again.

Step 730: Control torque of the first mechanical wheels and torque of second knee joints to control second leg parts of the robot to be suspended, by using the second leg parts as force application points and the first mechanical wheels as force-bearing points. The second leg parts each include a bendable second knee joint.

For example, after the first mechanical wheels on knee joints of the first leg parts are placed on the ground, the second leg parts are used as the force application points. For example, torque of the second knee joints is controlled to bend the second knee joints in a direction in which vertical heights between second mechanical wheels and a horizontal plane increase, by using second feet of the second leg parts in contact with an operating plane of the robot as the force application points and the first mechanical wheels as the force-bearing points corresponding to the force application points. In other words, bending angles of the second knee joints are increased in a direction in which vertical heights between second mechanical wheels and a horizontal plane increase.

In one embodiment, the second leg parts each include a second upper leg part and a second lower leg part, the second upper leg part and the second lower leg part are connected by the second knee joint, and the second upper leg part is connected to a main body part. For example, increasing the bending angle of the second knee joint indicates increasing an included angle between the second upper leg part and the second lower leg part.

In one embodiment, a first included angle between the second upper leg part and the second lower leg part and a second included angle between the second upper leg part and the main body part are determined.

For example, during bending the second knee joints in the direction in which the vertical heights between the second mechanical wheels and the horizontal plane increase, at least two factors need to be considered: First, to ensure that the robot can maintain a stable balanced state at the end of a swing-up action, an inclination angle (theta) of the robot during the swing-up action needs to be planed. The inclination angle indicates an included angle between the main body part of the robot and the horizontal plane. Second, during the swing-up action, resistance of the second leg parts and the first mechanical wheels needs to be increased to avoid slipping. Otherwise, the swing-up action may be affected due to loss of momentum during the swing-up action.

In one embodiment, during bending the second knee joints in the direction in which the vertical heights between the second mechanical wheels and the horizontal plane increase, the first included angles between the second upper leg parts and the second lower leg parts as well as the second included angles between the second upper leg parts and the main body parts are determined. For example, the first included angle between the second upper leg part and the second lower leg part and the second included angle between the second upper leg part and the main body part are obtained in real time by using a corresponding processor of the robot. Alternatively, the first included angle between the second upper leg part and the second lower leg part and the second included angle between the second upper leg part and the main body part are obtained periodically by using a corresponding processor of the robot.

In one embodiment, a process of obtaining the first included angle and the second included angle is described.

For example, given a designed total duration T (for example, seconds) for the swing-up action of the first leg part, an inclination angle θ (for example, radian) of the robot needs to change within the duration T from an initial angle θ, before the swing-up action begins to an end angle $\theta_f=\pi/2$ after the swing-up action is completed. In addition, at the beginning of the swing-up action and at the end of the swing-up action, an angular velocity of the inclination angle of the robot is θ=0.

In one embodiment, an expected inclination trajectory $\theta_{ref}(t)$ during the swing-up process of the robot is obtained by an interpolation of a quartic spline curve.

Figure 8:
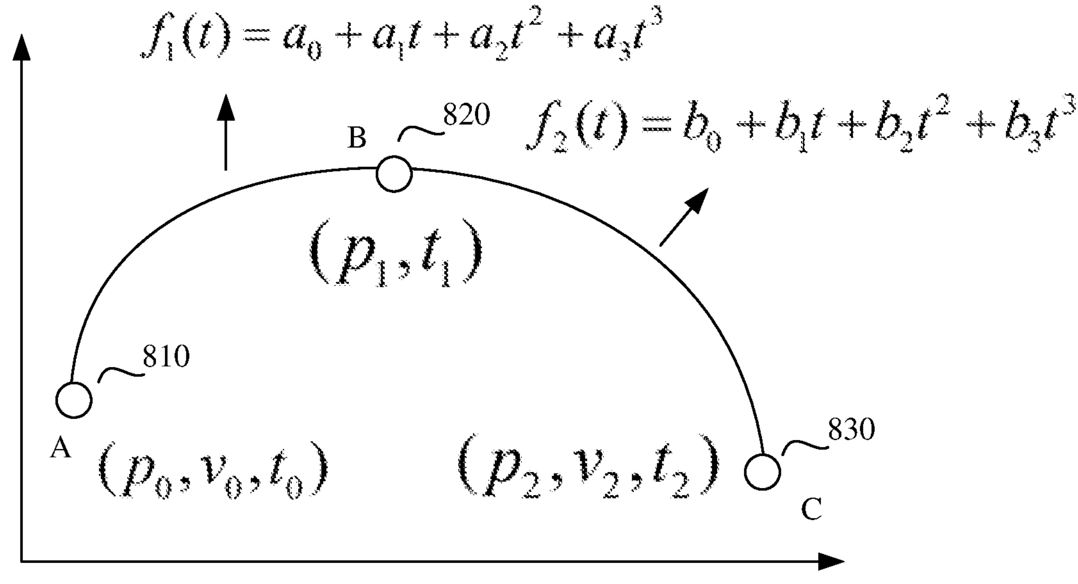
FIG. 8 is a schematic diagram of a function of a sample curve interpolation according to an exemplary embodiment of the present disclosure.

In one embodiment, during the swing-up action of the robot, an inclination angle of the robot corresponding to a specific moment is set additionally. For example, when t=T/2, $\theta_{ref}(t)=\pi/3$. For example, FIG. 8 is a schematic diagram of a function of a sample curve interpolation. The horizontal axis represents time of the robot during a swing-up process, and the vertical axis represents a position of the center of gravity of the robot during a swing-up process.

A function p(t) is used for representing a spline curve interpolation. An interpolation of a quartic spline curve of the function p(t) is calculated by using a functional image in FIG. 8, which includes a point A 810, a point B 820, and a point C 830.

$$\begin{cases} p_0 = a_0 + a_1 t_0 + a_2 t_0^2 + a_3 t_0^3 \\ v_0 = a_1 + 2a_2 t_0 + 3a_3 t_0^2 \\ p_1 = a_0 + a_1 t_1 + a_2 t_1^2 + a_3 t_1^3 \\ p_1 = b_0 + b_1 t_1 + b_2 t_1^2 + b_3 t_1^3 \\ p_2 = b_0 + b_1 t_2 + b_2 t_2^2 + b_3 t_2^3 \\ v_2 = b_1 + 2b_2 t_2 + 3b_3 t_2^2 \\ a_1 + 2a_2 t_1 + 3a_3 t_1^2 = b_1 + 2b_2 t_1 + 3b_3 t_1^2 \\ 2a_2 + 6a_3 t_1 = 2b_2 + 6b_3 t_1 \end{cases}$$

Figure 9:
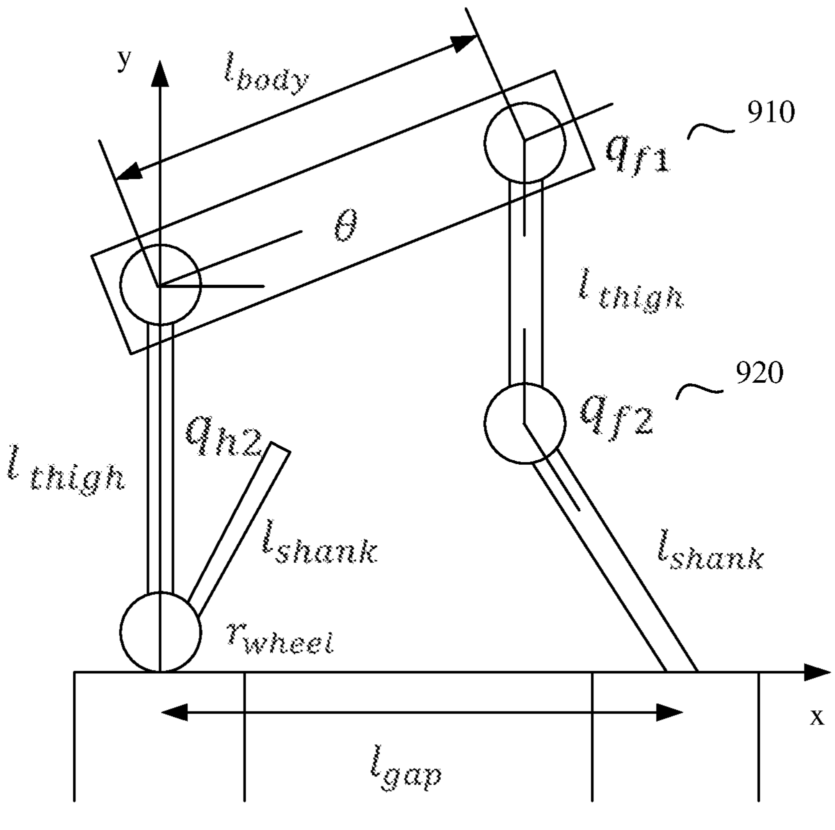
FIG. 9 is a schematic diagram of determining a first included angle and a second included angle according to an exemplary embodiment of the present disclosure.

$p_0$, $p_1$, and $p_2$ are used for indicating a distance between the center of gravity of the robot and a horizontal plane. $t_0$, $t_1$, and $t_2$ are used for indicating time of the robot during the swing-up process. $v_0$ and $v_2$ are used for indicating an operating speed of the robot. $\alpha_0$, $\alpha_1$, $\alpha_2$, $\alpha_3$, $b_0$, $b_1$, $b_2$, and $b_3$ are used for indicating a coefficient of a spline curve. In addition, after a trajectory of a body inclination angle of the robot is designed, motion trajectories corresponding to a first leg part and a second leg part needs to be calculated, to implement following of the body inclination angle. For example, FIG. 9 is a schematic diagram of acquisition of a first included angle 910 and a second included angle 920 during a process of obtaining the first included angle and the second included angle. Distances between the main body part, a total length of the first leg part, and a total length of the second leg part are fixed during the swing-up action of the robot, and based on the foregoing process, the body inclination angle θ of the robot can be determined. Therefore, the first included angle 910 $q_{f1}$ between the second upper leg part and the second lower leg part, the second included angle 920 $q_{f2}$ between the second upper leg part and the main body part, and a third included angle $q_{h1}$ between the main body part and the horizontal plane can be calculated based on geometric relationships.

In one embodiment, because of a mechanical structure design of the robot, after the first mechanical wheel is used as the force-bearing balance point, an angle $q_{h1}$ between the first upper leg part and the second upper leg part corresponding to the first leg part is fixed, for example, $q_{h1}=\pi/6$, and no processing is needed during the swing-up process. In one embodiment, a contact point between the first mechanical wheel and the operating plane of the robot is used as an origin to establish a rectangular coordinate system. Based on this, $q_{h1}=\theta$. In one embodiment, a part between the second upper leg part and the main body part correspondingly includes a hip (hip) joint. The coordinate of the hip joint is determined based on geometric relationships and is represented as:

$$p_{fh} = (x_{fh}, y_{fh}) = (l_{body}\cos(\theta), r_{wheel} + l_{thigh} + l_{body}\sin(\theta))$$

$x_{fh}>y_{fh}$ indicates an abscissa value and an ordinate value of $P_{fh}$.$l_{body}$ indicates the length of the main body part.$r_{wheel}$ indicates the radius of a first foot. $l_{thigh}$ indicates the length of the second upper leg part.

In addition, the coordinate of a contact point between the second lower leg part and the operating plane (that is, a foothold of the second lower leg part) is represented as:

$$p_{ff} = (x_{ff}, y_{ff}) = (l_{gap}, 0)$$

$x_{ff}$, $y_{ff}$ indicates an abscissa value and an ordinate value of $P_{ff}$, $l_{gap}$ indicates a distance between the foothold of the second lower leg part and an origin.

Based on $P_{fh}$ and $P_{ff}$, a distance between the hip joint and the foothold of the second lower leg part is determined. In other words, $$l_{fh,ff} = \left((x_{ff} - x_{fh})^2 + (y_{ff} - y_{fh})^2\right)^{1/2}$$

based on $l_{thigh}$, $l_{shank}$, and $l_{fh,ff}$, the second included angle 920 $q_{f2}$ between the second upper leg part and the main body part can be obtained according to the cosine theorem.

$$q_{f2} = \arccos\left(\frac{l_{thigh}^2 + l_{shank}^2 - l_{fh,ff}^2}{2l_{thigh}l_{shank}}\right)$$

$l_{thigh}$ indicates the length of the first upper leg part. $l_{shank}$ indicates the length of the first lower leg part.

In addition, the first included angle 910 $q_{f1}$ between the second upper leg part and the second lower leg part is determined.

$$q_{f1} = \theta + \arcsin\left(\frac{y_{fh}}{l_{fh,ff}}\right) + \arccos\left(\frac{l_{thigh}^2 + l_{fh,ff}^2 - l_{shank}^2}{2l_{thigh}l_{fh,ff}}\right)$$

In one embodiment, control torque for the second leg part to achieve the suspended state is determined based on the first included angle and the second included angle. In one embodiment, the first included angle and the second included angle are monitored to determine control torque for the second leg part to achieve the suspended state.

In one embodiment, after included angles such as the first included angle and the second included angle are obtained, a corresponding angular velocity is obtained by differential. Finally, the calculated included angles such as the first included angle and the second included angle as well as the calculated angular velocity are sent to a corresponding joint motor, so that following of the motor to the included angles and angular velocity is implemented, thereby assisting the implementation of the swing-up motion of the second leg part.

For example, based on additional particle dynamics control, control torque corresponding to each motor, including the control torque for the second leg part to achieve the suspended state, is calculated by pose feedback of the main body part and the leg parts of the robot.

In one embodiment, the second leg part of the robot is controlled to be suspended based on the control torque. For example, after the control torque is determined, torque information corresponding to the control torque is sent to a motor that controls the second leg part to be suspended, so that the motor controls the second leg part of the robot to be suspended based on the control torque.

In this embodiment, during adjusting the second leg parts of the robot, the torque of the first mechanical wheels and the torque of the second knee joints are controlled by using the second leg parts as the force application points and the first mechanical wheels as the force-bearing points, to control the second leg parts to be suspended. In this way, the robot can keep balance during adjusting the second leg parts of the robot to be in the suspended state, so that the stability of the robot during the swing-up motion is improved.

Step 740: Control rotation of the first mechanical wheels to keep the robot stable in a balanced state.

The balanced state indicates a balanced state after the swing-up motion instruction is executed.

For example, after the second leg parts of robot are controlled to be suspended, the first upper leg parts are adjusted by controlling the rotation of the first mechanical wheels, so that the first upper leg parts can be as stable as possible while supporting the second leg parts and the main body part.

In one embodiment, the included angle between the first upper leg part and the horizontal plane is adjusted by controlling the rotation of the first mechanical wheel. When the included angle between the first upper leg part and the horizontal plane reaches a preset adjustment condition, the robot is stable in a balanced state.

For example, the preset adjustment condition indicates a preset adjustment condition, and when the included angle between the first upper leg part and the horizontal plane reaches the preset adjustment condition, the robot enters the balanced state. For example, the preset adjustment condition is that the first upper leg part can support the second leg part and the main body part, and the angle between the first upper leg part and the horizontal plane is within a preset angle range. For example, the preset angle range is 5°. This means that when the first upper leg part can support the second leg part and the main body part, and the angle between the first upper leg part and the horizontal plane is less than or equal to 5°, the robot enters the balanced state. Alternatively, the preset adjustment condition is that the first upper leg part can support the second leg part and the main body part, and the first upper leg part is perpendicular to the horizontal plane. This means that when the first upper leg part can support the second leg part and the main body part and is perpendicular to the horizontal plane, the robot enters the balanced state.

In one embodiment, an example in which the robot is a quadruped robot dog is used for description. When two legs of the quadruped robot dog leave the operating plane, the quadruped robot dog is supported by two other legs. When the quadruped robot dog enters a balanced state based on the two other legs, the balanced state is referred to as a two-wheeled balanced state, that is, a state in which the quadruped robot dog with the body upright and forelegs suspended moves back and forth based on driving wheels on knee joints of hind legs on the ground, to maintain a balanced state.

For example, after the second leg parts are in the suspended state, the knee joints are adjusted to continue to rotate the first leg parts to be in line with the main body part of the robot, without needing to consider geometrical constraints.

In one embodiment, the first upper leg parts are adjusted by using the first mechanical wheels to keep the robot stable in a balanced state, and at the same time, the second leg parts are rotated to a posture required for the balanced state. Alternatively, after the first upper leg parts are adjusted by using the first mechanical wheels to keep the robot stable in a balanced state, the second leg parts are rotated to a posture required for the balanced state.

For example, after the robot is stable in a balanced state, if the second leg parts are required to be presented in a state of being bent and placed in front of the main body part, the second leg parts are bent and placed in front of the main body part. Alternatively, when the robot is stable in a balanced state, if the second leg parts are required to be presented in a stretched state, the second leg parts are stretched.

Figure 10:
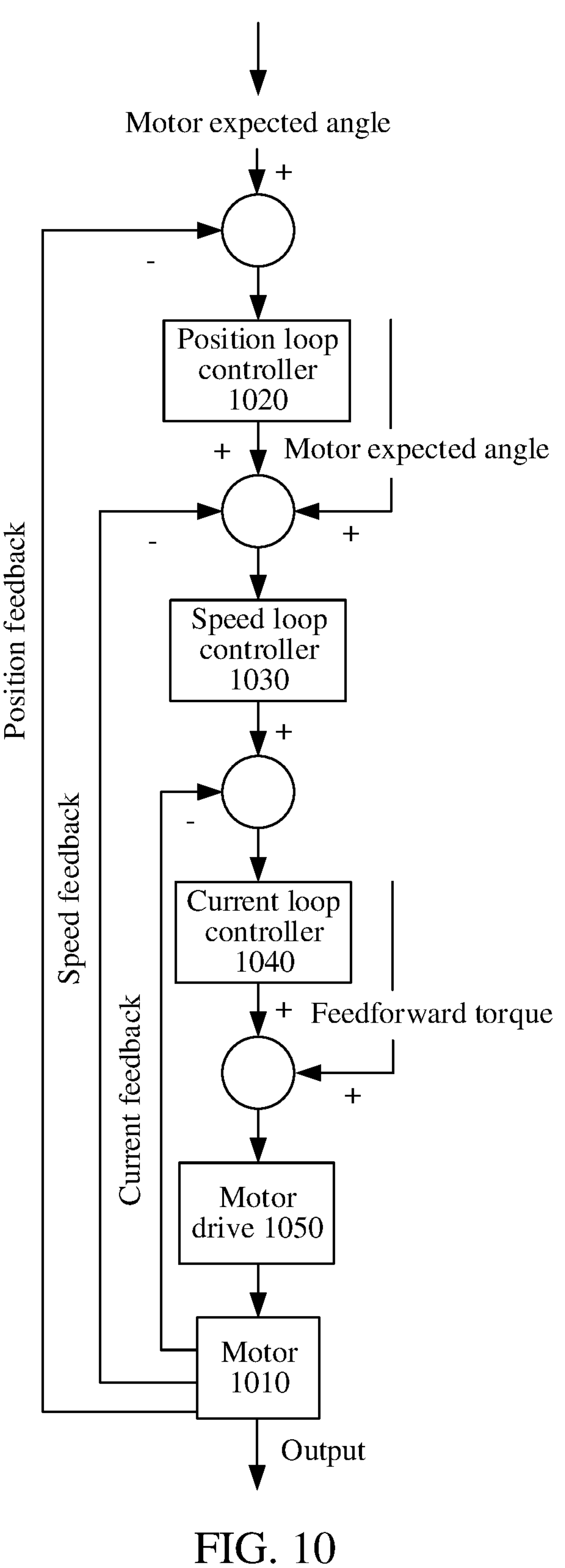
FIG. 10 is a schematic diagram of a processing process of a motor control module according to an exemplary embodiment of the present disclosure.

For example, refer to FIG. 10, which shows a motor control module corresponding to a robot. First, a motor expected angle is obtained, and after the motor expected angle is subtracted from position feedback output by a motor 1010, the result is input to a position loop controller 1020. Next, output of the position loop controller 1020 is added to the motor expected angle, the result is subtracted from speed feedback from the motor 1010, and a result is input to a speed loop controller 1030. After that, output of the speed loop controller 1030 is subtracted from current feedback from the motor 1010, and the result is input to a current loop controller 1040. Then, output of the current loop controller 1040 is added to feedforward torque, the result is input to a corresponding motor drive 1050, and a result of the motor drive is input to the motor 1010, so that the motor 1010 outputs a result, and each joint of the robot is controlled by a corresponding motor of the robot, for example, to perform a motion control process, a swing-up motion process, or the like.

In this embodiment of the present disclosure, a suspension process of a second leg part is described. After by using first mechanical wheels as force-bearing balance points, torque of the second knee joints is controlled to bend second knee joints in a direction in which vertical heights between second mechanical wheels and a horizontal plane increase, by using the second leg parts as force application points and the first mechanical wheels as force-bearing points. A first included angle between a second upper leg part and a second lower leg part and a second included angle between the second upper leg part and a main body part are determined. Control torque for the second leg part to achieve a suspended state is determined based on the first included angle and the second included angle. The second leg part of the robot is controlled to be suspended based on the control torque, and a motion state of the robot in a swing-up process can be ascertained more clearly by monitoring of the first included angle and the second included angle, so that operation of the robot can be adjusted more accurately based on the control torque. In addition, a first upper leg part can also be adjusted by using the first mechanical wheel, so that the robot can enter a balanced state after the swing-up process more quickly.

Figure 11:
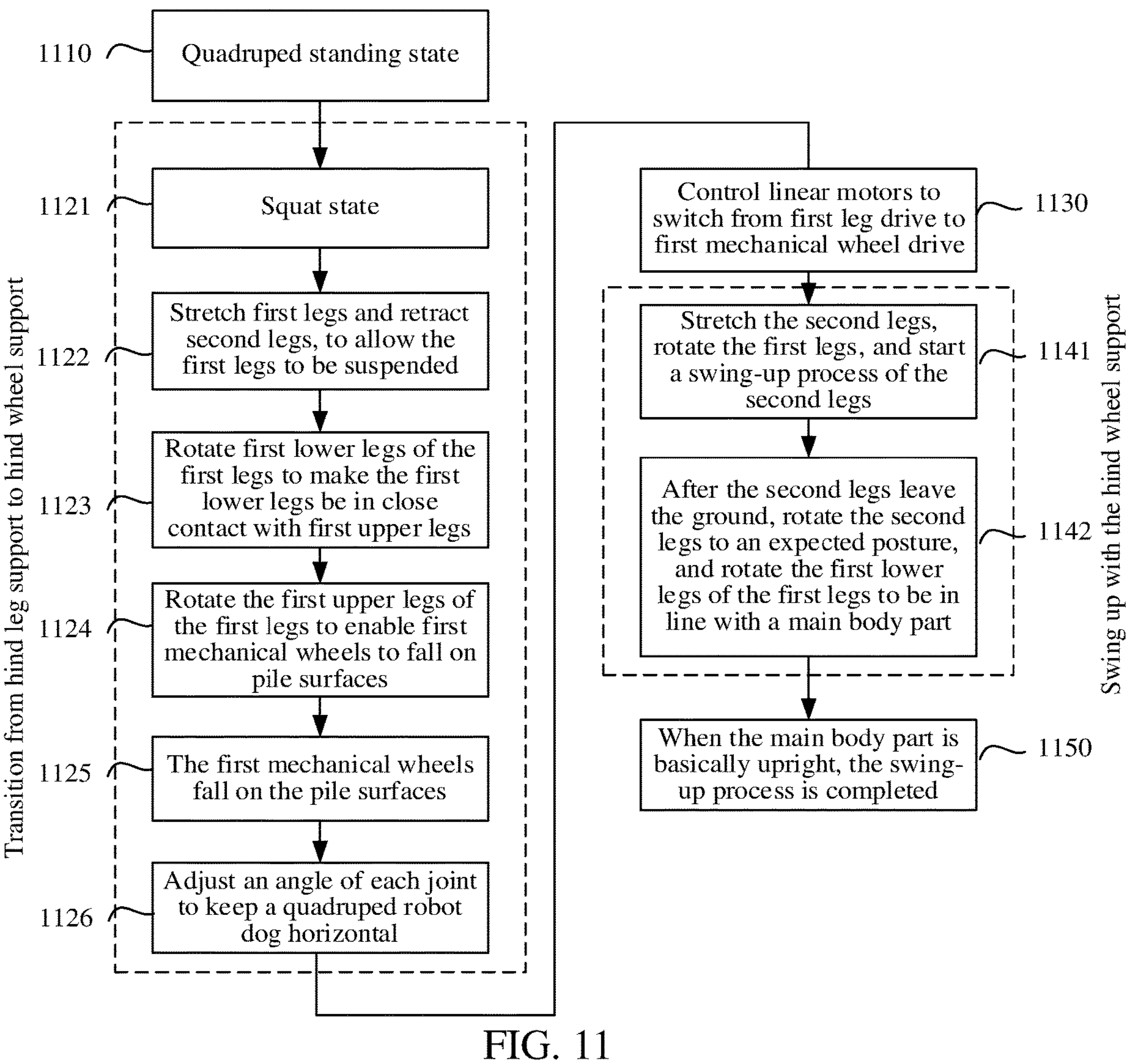
FIG. 11 is a flowchart of a swing-up motion method of a robot according to yet another exemplary embodiment of the present disclosure.

In one embodiment, an example in which the robot is a quadruped robot dog is used for description. When the quadruped robot dog is on pile surfaces with small areas for movement, in other words, an operating plane of the quadruped robot dog is discontinuously arranged pile surfaces, a process of placing the first mechanical wheels on the ground allows the swing-up process of the robot to be implemented more efficiently in a scenario of operating on the discontinuously arranged pile surfaces. For example, as shown in FIG. 11, the foregoing embodiment shown in FIG. 4 may alternatively be implemented as the following steps 1110 to 1150.

Step 1110: Quadruped standing state.

Figure 12:
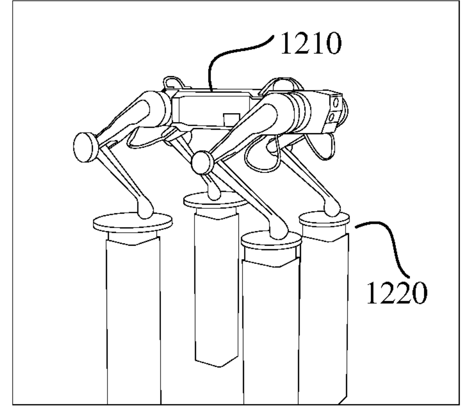
FIG. 12 is a schematic diagram of a quadruped robot dog in an initial state according to an exemplary embodiment of the present disclosure.

For example, FIG. 12 shows an initial state of a quadruped robot dog 1210. In addition, legs of the quadruped robot dog 1210 are located on pile surfaces 1220 (such as intermittently arranged quincuncial piles), and four leg parts fall on different pile surfaces. When the quadruped robot dog 1210 moves forward or backward, the four legs need to accurately fall on the other pile surfaces, and the legs cannot fall off from the pile surfaces. When the quadruped robot dog 1210 performs a swing-up motion, it is required to ensure that legs used for support during the swing up cannot leave pile surfaces where the legs are located, to prevent a swing-up failure. In other words, it is required to maintain stability of the legs used for support during the swing up within limited motion ranges.

A swing-up process includes the following two parts: (1) transition from hind leg support to hind wheel support; and (2) swing up with the hind wheel support.

(1) Transition from Hind Leg Support to Hind Wheel Support

In one embodiment, a process of transitioning from hind leg support to hind wheel support is implemented as the following step 1121 to step 1126.

Step 1121: Squat state.

Figure 13:
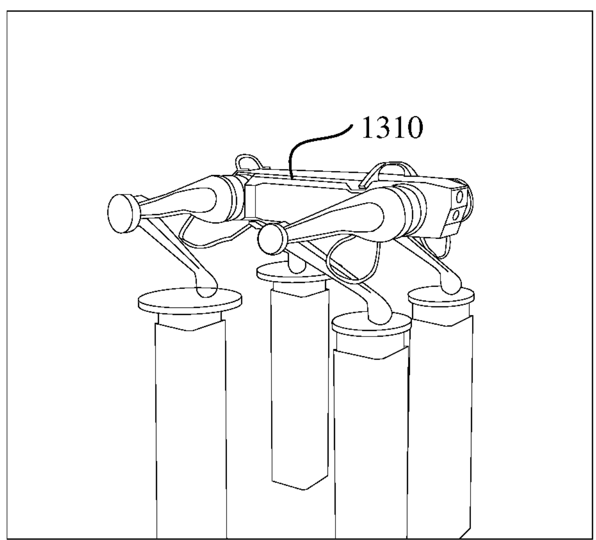
FIG. 13 is a schematic diagram of a quadruped robot dog in a squat state according to an exemplary embodiment of the present disclosure.

In one embodiment, a squat state is used as a preparation state for the quadruped robot dog to perform the swing-up process. For example, FIG. 13 shows that a quadruped robot dog 1310 enters a squat state when a swing-up process begins, to leave more leg stretching space for subsequent movement of first leg parts, thereby assisting the first leg parts in entering a suspended state. In one embodiment, after evaluation analysis, if it is determined that the quadruped robot dog can also complete the subsequent movement without squatting, then the quadruped robot dog does not squat. In other words, squat is not necessary.

Step 1122: Stretch first leg parts and retract second leg parts, to allow the first leg parts to be suspended.

Figure 14:
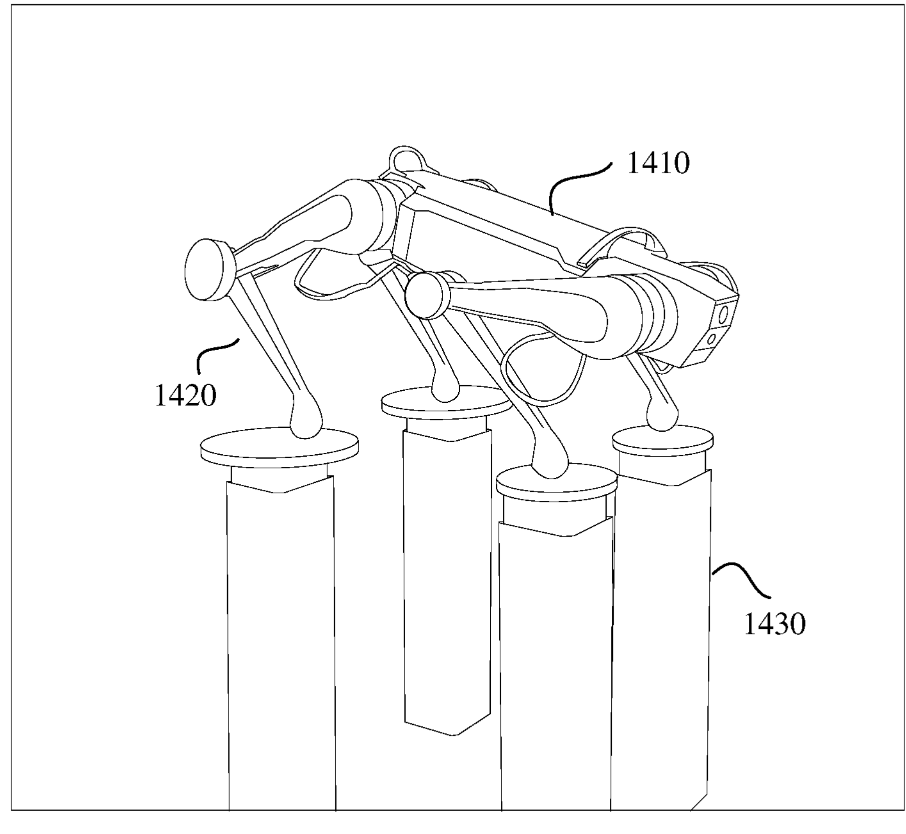
FIG. 14 is a schematic diagram of a quadruped robot dog in a state of stretching first leg parts according to an exemplary embodiment of the present disclosure.

For example, as shown in FIG. 14, a quadruped robot dog 1410 includes first leg parts 1420 as hind legs and second leg parts 1430 as forelegs, and when the hind legs (the first leg parts 1420) are used as support legs after the swing-up action is completed, the swing-up action indicates an action of lifting the forelegs (the second leg parts 1430). During a swing-up process of the second leg parts 1430, the quadruped robot dog 1410 is controlled to stretch the first leg parts 1420 (kicking the hind legs). In other words, bending angles of knee joints corresponding to the first leg parts 1420 are increased, and the quadruped robot dog 1410 is controlled to retract the first leg parts 1420 (retracting the forelegs). In other words, bending angles of knee joints corresponding to the second leg parts 1430 are decreased, so that the first leg parts 1420 enter a suspended state. Similarly, when the forelegs are used as support legs after the swing-up action is completed, the foregoing swing-up action indicates an action of lifting the hind legs. This is not limited in embodiments of the present disclosure.

Step 1123: Rotate first lower leg parts of the first leg parts to make the first lower leg parts be in close contact with first upper leg parts.

Figure 15:
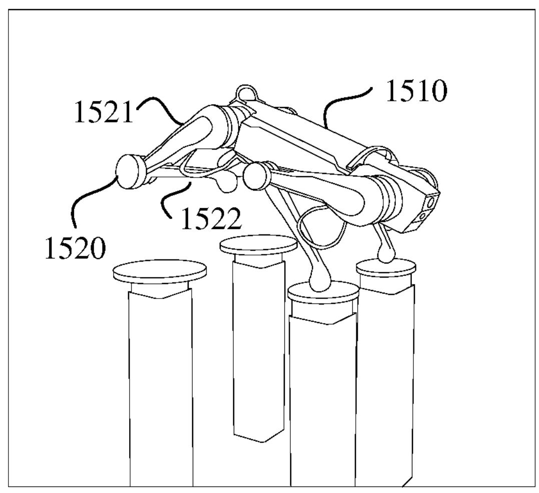
FIG. 15 is a schematic diagram of a quadruped robot dog in a leg retraction state according to an exemplary embodiment of the present disclosure.

For example, as shown in FIG. 15, first leg parts 1520 of a quadruped robot dog 1510 enter a suspended state. The first leg parts 1520 of the quadruped robot dog 1510 each include a first upper leg part 1521 and a first lower leg part 1522. A robot is controlled to rotate the first lower leg parts 1522 to decrease include angles between the first lower leg parts 1522 and the first upper leg parts 1521, to make the first lower leg parts 1522 be in close contact with the first upper leg parts 1521.

Step 1124: Rotate the first upper leg parts of the first leg parts to enable first mechanical wheels to fall on pile surfaces.

Figure 16:
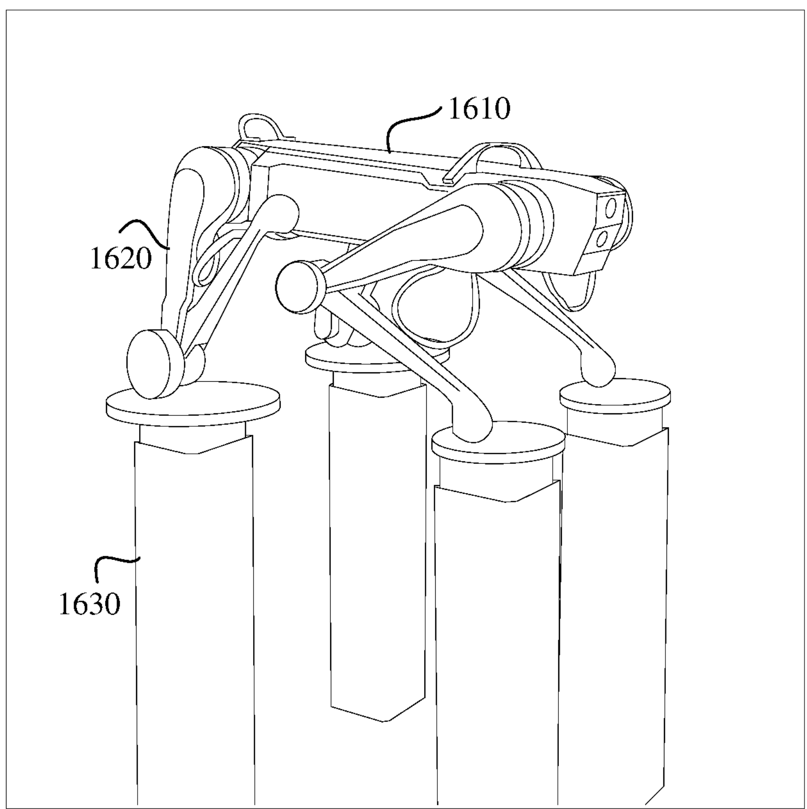
FIG. 16 is a schematic diagram of a state in which first mechanical wheels are placed on the ground according to an exemplary embodiment of the present disclosure.

For example, as shown in FIG. 16, when first lower leg parts of the quadruped robot dog 1610 are in close contact with a first upper leg part, first mechanical wheels 1620 corresponding to first knee joints connecting the first lower leg parts and the first upper leg parts are controlled to fall on pile surfaces.

Step 1125: The first mechanical wheels fall on the pile surfaces.

For example, pile surfaces 1630 are pile surfaces where the first leg parts of the quadruped robot dog 1610 before performing the swing-up action fall on. Alternatively, pile surfaces 1630 are new pile surfaces where the quadruped robot dog 1610 falls on during performing the swing-up action.

Step 1126: Adjust an angle of each joint to keep the quadruped robot dog horizontal.

For example, after a first mechanical wheel 1620 falls on the pile surface 1630, an angle of the first knee joint corresponding to the first mechanical wheel and a joint angle corresponding to the second leg part are adjusted to keep the quadruped robot dog horizontal, that is, to keep the main body part of the quadruped robot dog parallel to a horizontal plane.

Step 1130: Control linear actuators to switch from first leg part drive to first mechanical wheel drive.

For example, FIG. 1 and FIG. 2 are schematic diagrams of a structure of a quadruped robot dog.

For legs of the quadruped robot dog, each leg includes three motor drives. As shown in FIG. 5, a partially enlarged schematic diagram of a first leg part is used as an example. The three motor drives are a roll motor 530 (an ab/ad motor), a hip motor 540 (a first leg motor, which is a hip motor), and a knee motor 550 (a knee motor). The ab/ad motor is configured to drive the roll of the entire leg to rotate, the hip motor is configured to drive an upper leg (a first upper leg part or a second upper leg part) to rotate, and the knee motor drives a lower leg (a first lower leg part or a second lower leg part) by using a belt 560. A mechanical wheel on a knee joint is a passive wheel that provides no drive.

In one embodiment, when first leg parts are used as support legs at the end of a swing-up motion. The first leg parts each include a first upper leg part and a first lower leg part, the first upper leg part and the first lower leg part are connected by a first knee joint, and the first upper leg part is connected to a main body part. In one embodiment, the first lower leg part includes an insertion rod, and the insertion rod is controlled by a linear actuator to adjust a motion transmission state between the first lower leg part and the first knee joint. The linear actuator indicates a motor that converts electrical energy into mechanical energy for linear motion, and the insertion rod indicates a mechanical component controlled by the linear actuator. The motion transmission state, also called transmittingly connected state, indicates that the insertion rod is connected to a corresponding wheel groove of a groove plate.

In one embodiment, the first knee joint includes a groove plate, and the groove plate is correspondingly provided with at least one wheel groove.

In one embodiment, a linear actuator configured at the first lower leg part may control the insertion rod to perform an extending process and a retracting process. The extending process indicates inserting the insertion rod controlled by the linear actuator into the corresponding wheel groove of the groove plate. The retracting process indicates retracting the insertion rod controlled by the linear actuator from the corresponding wheel groove of the groove plate.

In one embodiment, the transmittingly connected state between the first knee joint and the first lower leg part is canceled in response to controlling the insertion rod to retract from the wheel groove. In other words, the transmittingly connected state between the first knee joint and the first lower leg part is canceled based on the retracting process.

For example, as shown in FIG. 5, when the first leg parts are used as support legs after the swing-up motion is completed, relative to second leg parts, a first lower leg part 532 of each first leg part includes a linear actuator 580. The linear actuator 580 is configured to control adjustment of a support state of the first leg part and a first mechanical wheel via an insertion rod 581.

Figure 17:
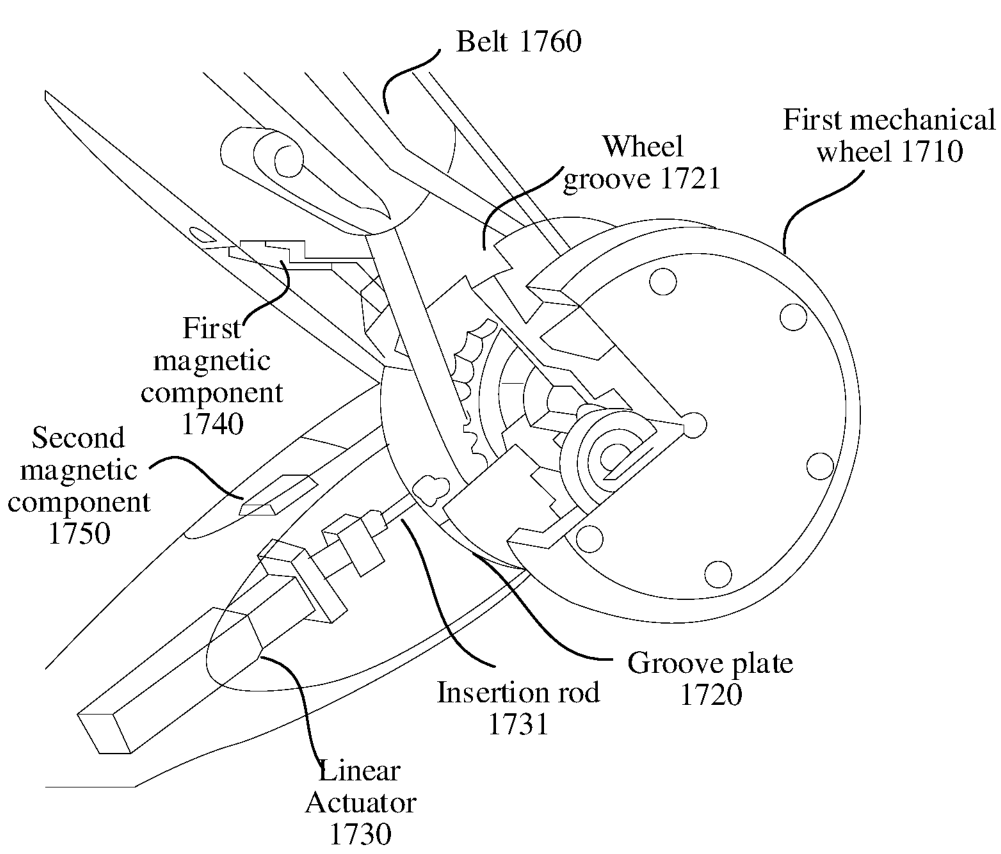
FIG. 17 is a partially enlarged schematic diagram of a first mechanical wheel before a first leg part is in a leg retraction state according to an exemplary embodiment of the present disclosure.

For example, FIG. 17 is a partially enlarged schematic diagram of the first mechanical wheel (the region indicated by a dotted box) in the partially enlarged schematic diagram of the first leg part shown in FIG. 5. FIG. 17 includes: a first mechanical wheel 1710 (a pulley), a groove plate 1720 (a groove plate), a linear actuator 1730 (a linear actuator) configured at the first lower leg part, an insertion rod 1731 controlled by the linear actuator 1730, a first magnetic component 1740 (a magnet) at the first upper leg part, a second magnetic component 1750 (steel) configured at the first lower leg part, and a belt 1760. The groove plate 1720 correspondingly includes a plurality of wheel grooves 1721.

When the linear actuator 1730 controls the insertion rod 1731 to perform an extending process, the insertion rod 1731 controlled by the linear actuator is inserted into a wheel groove 1721 corresponding to the groove plate 1720. Therefore, when the knee motor (shown as the knee motor 550 in FIG. 5, not shown in FIG. 17) drives the first mechanical wheel by using the belt 1760, the knee motor also drives rotation of the first lower leg part.

Figure 18:
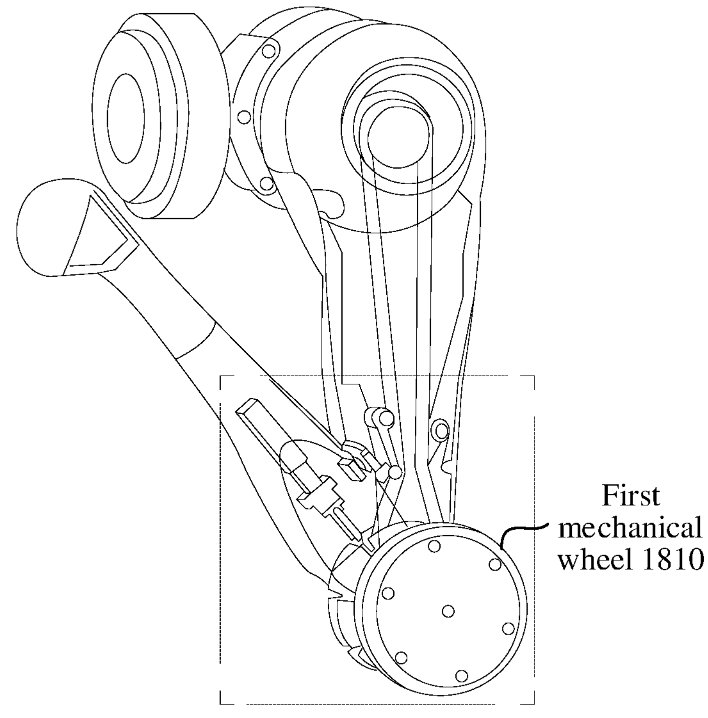
FIG. 18 is a schematic diagram of a state in which first mechanical wheels are placed on the ground according to an exemplary embodiment of the present disclosure.

For example, FIG. 18 is a schematic diagram of a first leg part after a linear actuator controls an insertion rod to perform a retracting process. FIG. 18 includes a region corresponding to a first mechanical wheel 1810 (as shown in a dashed box). To facilitate observation, the region corresponding to the first mechanical wheel 1810 is partially enlarged to obtain a partially enlarged schematic diagram of the first mechanical wheel shown in FIG. 19.

Figure 19:
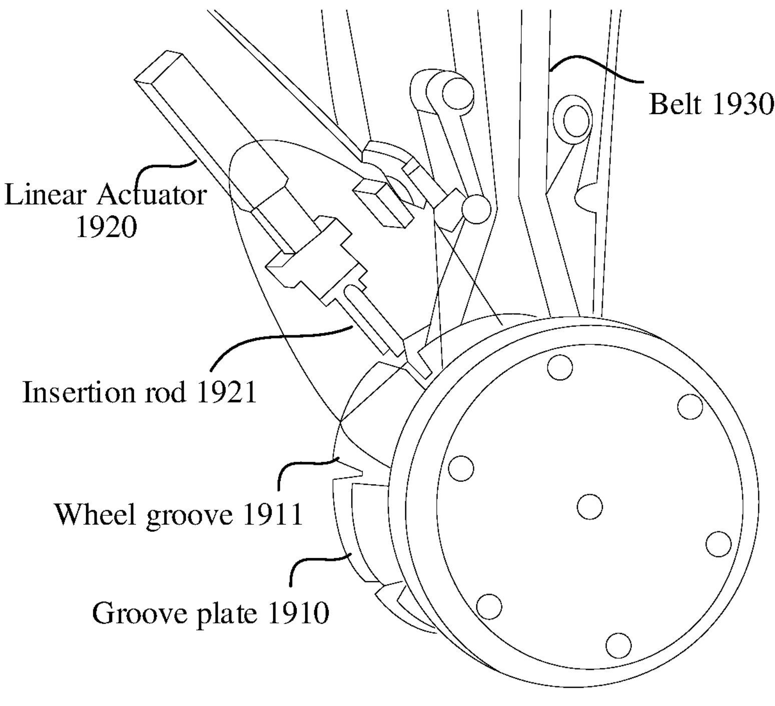
FIG. 19 is a partially enlarged schematic diagram of a first mechanical wheel when a first leg part is in a leg retraction state according to an exemplary embodiment of the present disclosure.

FIG. 19 includes: a groove plate 1910, a plurality of wheel grooves 1911 correspondingly included in the groove plate 1910, a linear actuator 1920 configured at the first lower leg part, an insertion rod 1921 controlled by the linear actuator 1920, a first magnetic component configured at the first upper leg part, a second magnetic component configured at the first lower leg part, and a belt 1930.

In one embodiment, when the linear actuator 1920 controls the insertion rod 1921 to perform a retracting process, the insertion rod 1921 controlled by the linear actuator 1920 is retracted from the corresponding wheel groove 1911 in the groove plate 1910, so that a transmittingly connected state between the first mechanical wheel and the first lower leg part is canceled. At this time, the knee motor (shown as the knee motor 340 in FIG. 3, not shown in FIG. 19) can only drive the first mechanical wheel, but cannot drive the first lower leg part. In addition, a magnetic matching relationship between the first magnetic component and the second magnetic component enables the first upper leg part and the second lower leg part to attract each other. In other words, the provision of the insertion rod in the first lower leg part, enables transitioning between wheel support (support with the first mechanical wheel) and foot support (support with the first foot corresponding to the first leg part) of the first leg part based on control of the insertion rod by the linear actuator.

In this embodiment, a groove plate is added to the first knee joint, and an insertion rod is added to the first lower leg part, so that the insertion rod is controlled by the linear actuator to adjust the transmittingly connected state between the first lower leg part and the first knee joint, so as to achieve an automatic adjustment state, thereby improving control efficiency of the robot performing the swing-up motion. In this embodiment, a motion state of the insertion rod is controlled to adjust the transmittingly connected state between the first knee joint and the first lower leg part in linkage, thereby improving control efficiency and accuracy of the robot.

(2) Swing Up with the Hind Wheel Support

In one embodiment, a process of transitioning from hind leg support to hind wheel support is implemented as the following step 1141 to step 1142.

Step 1141: Stretch the second leg parts, rotate the first leg parts, and start a swing-up process of the second leg parts.

Figure 20:
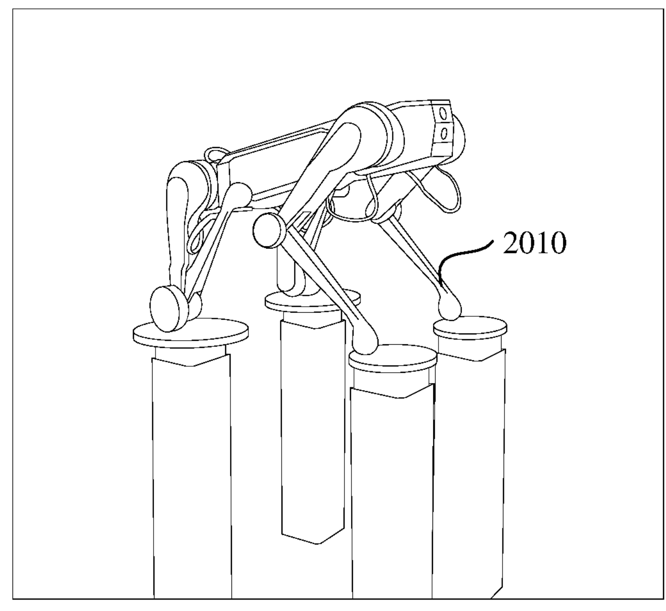
FIG. 20 is a schematic diagram of a quadruped robot dog in a state of stretching second leg parts according to an exemplary embodiment of the present disclosure.

For example, as shown in FIG. 20, when the quadruped robot dog is horizontal, a second leg part 2010 is stretched. To be specific, included angles between the second upper leg parts and the second lower leg parts (bending angles at the knee joints) are increased, and the first mechanical wheels are controlled to rotate, to control the first upper leg parts corresponding to the first leg parts to rotate to cause the quadruped robot dog to present an upward tilted motion posture and start the swing-up process of the second leg parts.

Step 1142: After the second leg parts leave the ground, rotate the second leg parts to an expected posture, and rotate the first lower leg parts of the first leg parts to be in line with the main body part.

Figure 21:
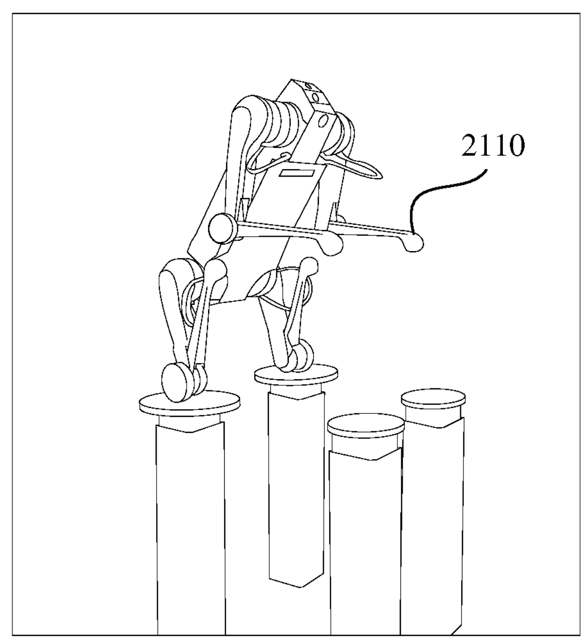
FIG. 21 is a schematic diagram of a quadruped robot dog with second leg parts in a suspended state according to an exemplary embodiment of the present disclosure.

For example, as shown in FIG. 21, after the second leg parts 2110 leave the ground, the posture of the second leg parts 2110 is adjusted and the second leg parts 2110 are rotated to the expected posture. The expected posture indicates a preset posture of the second leg part 2110. For example, the expected posture is a posture in which the main body part is positioned in front with an inclination angle of 30° between the second upper leg part and the second lower leg part.

Step 1150: When the main body part is basically upright, the swing-up process is completed.

Figure 22:
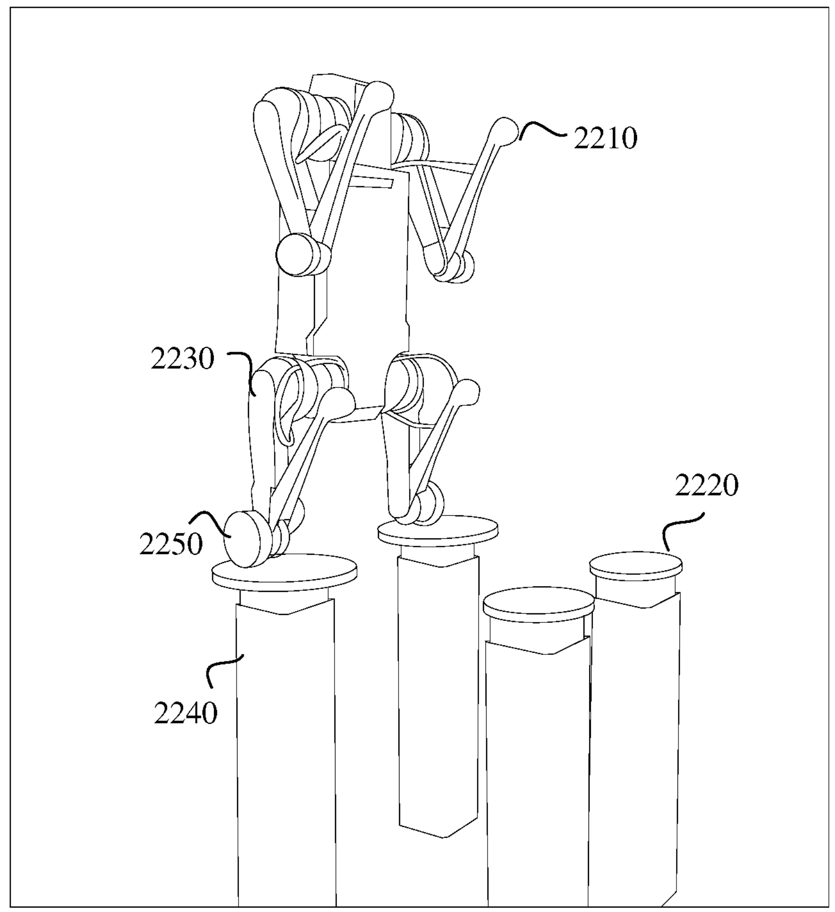
FIG. 22 is a schematic diagram of a quadruped robot dog in an upright state according to an exemplary embodiment of the present disclosure.

For example, as shown in FIG. 22, after the second leg parts 2210 leave first pile surfaces 2220, output torque of corresponding joints of the first leg parts are controlled to rotate hip joints 2230 to be in line with the main body part. In other words, the main body part is basically vertical to a second pile surface 2240, so that the swing-up process of the second leg part is completed. In one embodiment, in a process of enabling the main body part to be basically upright, positions of a first mechanical wheels 2250 on the second pile surfaces 2240 may be slightly adjusted, to implement the foregoing swing-up process with the first mechanical wheels 2250 maintained on the second pile surfaces 2240.

The foregoing describes a process of simultaneously transitioning of two first leg parts and lifting the second leg parts at the same time, by using a quadruped robot dog as an example. In other words, the foregoing content introduces that during transitioning from support with the first foots corresponding to the first leg parts to support with the first mechanical wheels corresponding to the first leg parts, the two second leg parts are simultaneously transitioned. A visual effect of the transitioning process is natural.

In one embodiment, the swing-up motion method of the robot provided in embodiments of the present disclosure may alternatively be implemented in a separate manner. To be specific, the first leg parts are separately transitioned from first foot support to first mechanical wheel support.

Figure 23:
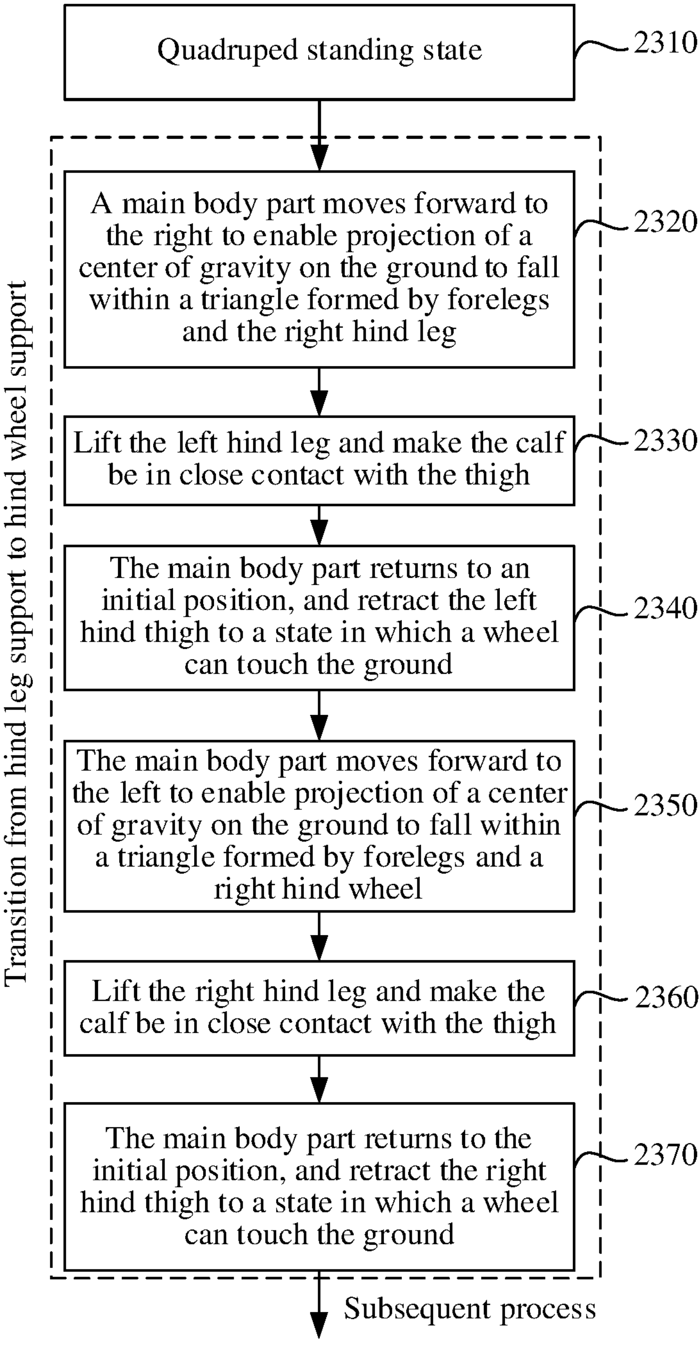
FIG. 23 is a flowchart of a swing-up motion method of a robot according to still yet another exemplary embodiment of the present disclosure.

In one embodiment, a quadruped robot dog is used as an example to describe a process of transitioning the two first leg parts from foot support to wheel support. For example, as shown in FIG. 23, step 1121 to step 1126 shown in the foregoing process of transitioning from hind leg support to hind wheel support may alternatively be implemented as the following step 2310 to step 2370.

Step 2310: Quadruped standing state.

Figure 24:
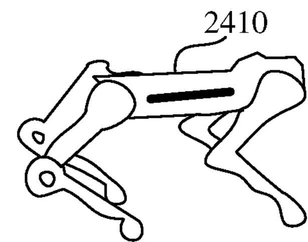
FIG. 24 is a schematic diagram of a quadruped robot dog in an initial state according to another exemplary embodiment of the present disclosure.

For example, FIG. 24 shows a quadruped standing state of a quadruped robot dog 2410.

Step 2320: A main body part moves forward to the right to enable projection of a center of gravity on the ground to fall within a triangle formed by forelegs and the right hind leg.

Figure 25:
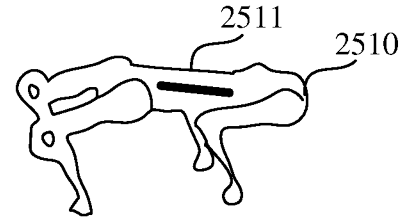
FIG. 25 is a schematic diagram of a quadruped robot dog in a state of stretching the left hind leg according to an exemplary embodiment of the present disclosure.

For example, as shown in FIG. 25, a main body part 2511 of a quadruped robot dog 2510 moves forward to the right to provide a larger motion space for the quadruped robot dog 2510, to facilitate lift of hind legs of the quadruped robot dog 2510.

Step 2330: Lift the left hind leg and make the calf be in close contact with the thigh.

Figure 26:
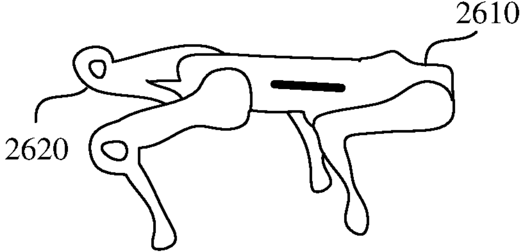
FIG. 26 is a schematic diagram a quadruped robot dog in a state of retracting the left hind leg according to an exemplary embodiment of the present disclosure.

For example, as shown in FIG. 26, a left hind leg 2620 of a quadruped robot dog 2610 is lifted, and the calf of the left hind leg 2620 is in close contact with the thigh of the left hind leg 2620. In other words, an included angle between the calf and thigh of the left hind leg 2620 is decreased.

Step 2340: The main body part returns to an initial position, and retract the left hind thigh to a state in which a wheel can touch the ground.

Figure 27:
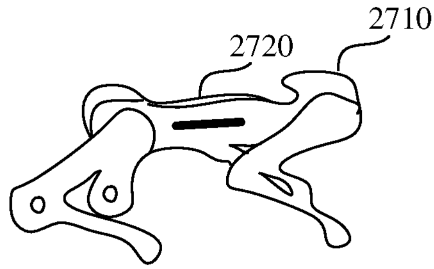
FIG. 27 is a schematic diagram of a state in which a wheel corresponding to the left hind leg is placed on the ground according to an exemplary embodiment of the present disclosure.

For example, as shown in FIG. 27, after the calf of the left hind leg of a quadruped robot dog 2710 is in close contact with the thigh, a main body part 2720 returns to an initial position, and the left hind thigh is retracted to a state in which a wheel 2730 can touch the ground, so that the wheel 2730 corresponding to the left hind thigh is placed on the ground.

Step 2350: The main body part moves forward to the left to enable projection of a center of gravity on the ground to fall within a triangle formed by forelegs and a right hind wheel.

Figure 28:
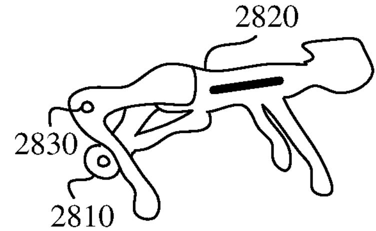
FIG. 28 is a schematic diagram of a quadruped robot dog in a state of stretching the right hind leg according to an exemplary embodiment of the present disclosure.

For example, as shown in FIG. 28, after a wheel 2810 corresponding to the left hind thigh is placed on the ground, a main body part of a quadruped robot dog 2820 is moved forward to the left, to enable the projection of the center of gravity on the ground to fall within the triangle formed by the forelegs and the right hind wheel, so that a corresponding wheel 2830 enters an on-ground state.

Step 2360: Lift the right hind leg and make the calf be in close contact with the thigh.

Figure 29:
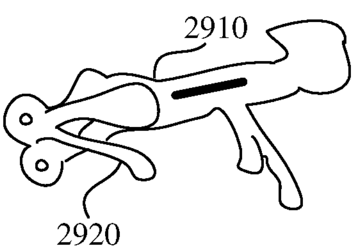
FIG. 29 is a schematic diagram of a quadruped robot dog in a state of retracting the right hind leg according to an exemplary embodiment of the present disclosure.

For example, as shown in FIG. 29, a right hind leg 2920 of a quadruped robot dog 2910 is lifted, and the calf of the right hind leg 2920 is in close contact with the thigh of the right hind leg 2920. In other words, an included angle between the calf and thigh of the right hind leg 2920 is decreased.

Step 2370: The main body part returns to the initial position, and retract the right hind thigh to a state in which a wheel can touch the ground.

Figure 30:
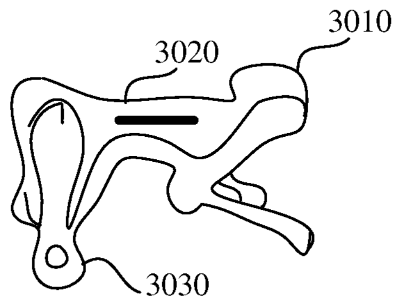
FIG. 30 is a schematic diagram of a state in which wheels are placed on the ground according to an exemplary embodiment of the present disclosure.

For example, as shown in FIG. 30, after the calf of the right hind leg of a quadruped robot dog 3010 is in close contact with the thigh, a main body part 3020 returns to an initial position, and the right hind thigh is retracted to a state in which a wheel 3030 can touch the ground, so that the wheel 3030 corresponding to the right hind thigh is placed on the ground.

Figure 31:
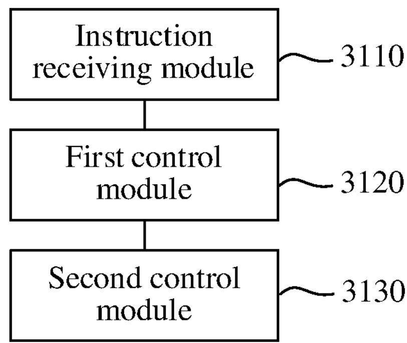
FIG. 31 is a block diagram of a structure of a swing-up motion apparatus of a robot according to an exemplary embodiment of the present disclosure.

FIG. 31 is a block diagram of a structure of a swing-up motion apparatus of a robot according to an exemplary embodiment of the present disclosure. An example in which the apparatus is provided in a robot is used. The robot includes legs and a main body part connected to the legs.

The legs each include a bendable knee joint, and the knee joint includes a mechanical wheel. The legs include first leg parts and second leg parts, and the first leg part and the second leg part are arranged in order in a swing-up direction of the robot as shown in FIG. 31. The apparatus includes:

- an instruction receiving module 3110, configured to receive a swing-up motion instruction;
- a first control module 3120, configured to control, in response to the swing-up motion instruction, the first leg parts of the robot to be in a suspended state, perform a leg retraction movement of the first leg parts, and at the end of the suspended state, place first mechanical wheels on knee joints of the first leg parts on an operating plane, the suspended state indicating that the first leg parts leave the operating plane; and
- a second control module 3130, configured to control the second leg parts of the robot to be suspended and keep stable in a balanced state, by using the first mechanical wheels as force-bearing balance points.

In one embodiment, the first leg parts each include a bendable first knee joint. The first control module 3120 is further configured to control torque of the first knee joints in response to the swing-up motion instruction to bend the first knee joints in a direction in which vertical heights between first mechanical wheels and a horizontal plane increase, until the first leg parts of the robot are in the suspended state.

In one embodiment, the first leg parts each include a first upper leg part and a first lower leg part, the first upper leg part and the first lower leg part are connected by the first knee joint, and the first upper leg part is connected to the main body part. The first control module 3120 is further configured to control the torque of the first knee joints to decrease included angles between the first upper leg parts and the first lower leg parts, to implement the leg retraction movement of the first leg parts.

In one embodiment, the first upper leg part is provided with a first magnetic component, the first lower leg part is provided with a second magnetic component, and a magnetic matching relationship exists between the first magnetic component and the second magnetic component. The first control module 3120 is further configured to control the torque of the first knee joints to decrease the included angles between the first upper leg parts and the first lower leg parts. When the included angles reach a preset included angle threshold, the leg retraction movement of the first leg parts is implemented via attraction between the first magnetic components provided on the first upper leg parts and the second magnetic components provided on the first lower leg parts.

In one embodiment, the first leg parts each include a first upper leg part and a first lower leg part, the first upper leg part and the first lower leg part are connected by the bendable first knee joint, and the first upper leg part is connected to the main body part. The first control module 3120 is further configured to determine a motion allowed region, the motion allowed region referring to a region where the first leg part is located on the operating plane during the swing-up motion; and use the motion allowed region as an operating plane support range for the first mechanical wheel during the first upper leg part and the first lower leg part performing the leg retraction movement.

In one embodiment, the robot includes first leg joints, the first leg joints being configured to control torque of the first upper leg parts. The first control module 3120 is further configured to, during the first upper leg part and the first lower leg part performing the leg retraction movement, control torque of the first leg joint to adjust an included angle between the first upper leg part and a horizontal plane, to enable the first mechanical wheel to fall within the motion allowed region; and use a contact point between the first mechanical wheel and the motion allowed region as the force-bearing balance point in response to that the first mechanical wheel falls within the motion allowed region.

In one embodiment, the first leg parts each include a first upper leg part and a first lower leg part, the first upper leg part and the first lower leg part are connected by the first knee joint, and the first upper leg part is connected to the main body part. The first knee joint includes a groove plate, and the groove plate is correspondingly provided with at least one wheel groove. The first lower leg part includes an insertion rod, the insertion rod is controlled by a linear actuator to adjust a transmittingly connected state between the first lower leg part and the first knee joint, the linear actuator indicates a motor that converts electrical energy into linear motion mechanical energy, and the insertion rod is a mechanical component controlled by the linear actuator.

In one embodiment, the second control module 3130 is further configured to cancel the transmittingly connected state between the first knee joint and the first lower leg part in response to controlling the insertion rod to retract from the wheel groove.

In one embodiment, the second leg parts each include a second upper leg part and a second lower leg part, the second upper leg part and the second lower leg part are connected by a bendable second knee joint, and the second upper leg part is connected to the main body part. The second control module 3130 is further configured to control torque of the first mechanical wheels and torque of the second knee joints to control the second leg parts of the robot to be suspended, by using the second leg parts as force application points and the first mechanical wheels as force-bearing points.

In one embodiment, the second control module 3130 is further configured to control rotation of the first mechanical wheels to enable the robot to enter the balanced state, the balanced state indicating a state after the swing-up motion instruction is executed.

In one embodiment, the second control module 3130 is further configured to control the rotation of the first mechanical wheels to adjust the included angles between the first upper leg parts and the horizontal plane. When the included angles between the first upper leg parts and the horizontal plane reach a preset adjustment condition, the robot enters the balanced state.

In the swing-up motion apparatus of the robot provided in the foregoing embodiments, the division of the foregoing functional modules is merely described as an example. In actual application, the foregoing functions may be assigned as needed to be implemented by different functional modules. In other words, an internal structure of a device is divided into different functional modules, to implement all or part of the functions described above. Each module can be implemented using one or more processors (or processors and memory). Likewise, a processor (or processors and memory) can be used to implement one or more modules. In addition, the swing-up motion apparatus of the robot provided in the foregoing embodiments and the swing-up motion method of the robot in the embodiments fall within the same concept. For details of specific implementation, refer to the method embodiments. Details are not described herein again.

Figure 32:
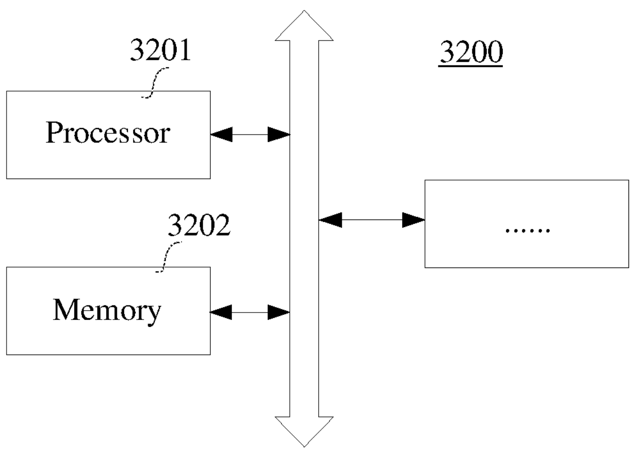
FIG. 32 is a block diagram of a structure of a terminal according to an exemplary embodiment of the present disclosure.

FIG. 32 is a block diagram of a structure of a computer device 3200 according to an exemplary embodiment of the present disclosure. The computer device 3200 may be a portable mobile terminal, such as a smartphone, a tablet computer, a MOVING PICTURE EXPERTS GROUP AUDIO LAYER III (MP3) player, a Moving Picture Experts Group Audio Layer IV (MP4) player, a notebook computer, or a desktop computer. The computer device 3200 may also be referred to as another name such as user equipment, a portable terminal, a laptop terminal, or a desktop terminal.

In one embodiment, the computer device 3200 is a device for remote connection with a robot. Alternatively, the computer device 3200 is a control device installed in a robot.

In this embodiment of the present disclosure, the computer device 3200 is implemented as a control device in a wheeled-legged robot.

Generally, the computer device 3200 includes: a processor 3201 and a memory 3202.

The processor 3201 may include one or more processing cores, for example, a four-core processor or an eight-core processor. The processor 3201 may be implemented in at least one hardware form of a digital signal processor (DSP), a field-programmable gate array (FPGA), and a programmable logic array (PLA). The processor 3201 may also include a main processor and a coprocessor. The main processor is a processor configured to process data in an awake state, and is also referred to as a central processing unit (CPU). The coprocessor is a low-power processor configured to process data in a standby state. In some embodiments, the processor 3201 may have a graphics processing unit (GPU) integrated thereon. The GPU is configured to render and draw content to be displayed on a display screen. In some embodiments, the processor 3201 may further include an artificial intelligence (AI) processor. The AI processor is configured to process computing operations related to machine learning.

The memory 3202 may include one or more computer-readable storage media. The computer-readable storage medium may be non-transient. The memory 3202 may further include a high-speed random access memory and a nonvolatile memory, for example, one or more disk storage devices or flash storage devices. In some embodiments, the non-transitory computer-readable storage medium in the memory 3202 is configured to store at least one instruction. The at least one instruction is configured to be executed by the processor 3201 to implement the swing-up motion method of a robot provided in the method embodiments of the present disclosure.

A person skilled in the art may understand that the structure shown in FIG. 32 constitutes no limitation on the computer device 3200. The computer device may include more or fewer components than those shown in FIG. 32, or some components may be combined, or a different component deployment may be used.

An embodiment of the present disclosure further provides a robot. The robot includes a processor and a memory. The memory has at least one instruction, at least one program, a code set, or an instruction set stored thereon. The at least one instruction, the at least one program, the code set, or the instruction set are loaded and executed by the processor to implement the swing-up motion method of a robot provided in the foregoing method embodiments of the present disclosure.

An embodiment of the present disclosure further provides a computer-readable storage medium. The computer-readable storage medium has at least one computer-readable instruction, at least one program, a code set, or an instruction set stored thereon. The at least one instruction, the at least one program, the code set, or the instruction set are loaded and executed by the processor to implement the swing-up motion method of a robot provided in the foregoing method embodiments of the present disclosure.

An embodiment of the present disclosure further provides a computer program product or a computer program. The computer program product or the computer program includes computer instructions stored on a computer-readable storage medium. A processor of a computer device reads the computer instructions from the computer-readable storage medium, and the processor executes the computer instructions to enable the computer device to perform the swing-up motion method of a robot according to any one of the foregoing embodiments.

What is claimed is:

1. A swing-up motion method of a robot, the method being performed by a computer device, the robot comprising legs and a main body part connected to the legs, each of the legs comprising a bendable knee joint, and the knee joint comprising a mechanical wheel; the legs comprising first leg parts and second leg parts, each of first leg parts and the second leg parts comprising one or more of the legs, and the second leg parts and the first leg parts being arranged in order in a swing-up direction of the robot; and the method comprising:

receiving a swing-up motion instruction;

controlling, in response to the swing-up motion instruction, the first leg parts of the robot to be in a suspended state and out of contact with an operating plane, performing a leg retraction movement of the first leg parts, and at an end of the suspended state, placing one or more first mechanical wheels on one or more first knee joints of the first leg parts on the operating plane; and controlling the second leg parts of the robot to be suspended and keeping stable in a balanced state, by using the one or more first mechanical wheels as force-bearing balance points.

2. The method according to claim 1, wherein the controlling, in response to the swing-up motion instruction, the first leg parts of the robot to be in a suspended state comprises:

controlling torque of the first knee joints in response to the swing-up motion instruction to bend the one or more first knee joints in a direction in which vertical heights between the one or more first mechanical wheels and a horizontal plane increase, until the first leg parts of the robot are in the suspended state.

3. The method according to claim 2, wherein each leg of the first leg parts comprise a first upper leg part and a first lower leg part, the first upper leg part and the first lower leg part are connected by one of the bendable one or more first knee joints, and the first upper leg part is connected to the main body part; and the performing a leg retraction movement of the first leg parts comprises:

controlling the torque of the one or more first knee joints to decrease included angles between the first upper leg parts and the first lower leg parts, to implement the leg retraction movement of the first leg parts.

4. The method according to claim 3, wherein the first upper leg parts are each provided with a first magnetic component, the first lower leg parts are each provided with a second magnetic component, and a magnetic matching relationship exists between the first magnetic component and the second magnetic component; and the controlling the torque of the one or more first knee joints to decrease included angles between the first upper leg parts and the first lower leg parts, to implement the leg retraction movement of the first leg parts comprises:

controlling the torque of the one or more first knee joints to decrease the included angles between the first upper leg parts and the first lower leg parts; and when the included angles reach a preset included angle threshold, implementing the leg retraction movement of the first leg parts via attraction between the first magnetic components provided on the first upper leg parts and the second magnetic components provided on the first lower leg parts.

5. The method according to claim 1, wherein each leg of the first leg parts comprise a first upper leg part and a first lower leg part, the first upper leg part and the first lower leg part are connected by one of the bendable one or more first knee joints, and the first upper leg part is connected to the main body part; and the method further comprises:

determining a motion allowed region for each leg of the first leg parts, the motion allowed region referring to a region where the leg of the first leg parts is located on the operating plane during a swing-up motion of the robot; and using the motion allowed region as an operating plane support range for the first mechanical wheel during the leg retraction movement of the first upper leg part and the first lower leg part.

6. The method according to claim 5, wherein the robot comprises first leg joints, the first leg joints being configured to control torque of the first upper leg parts; and the using the motion allowed region as an operating plane support range for the first mechanical wheel during the first upper leg part and the first lower leg part performing the leg retraction movement comprises:

during the leg retraction movement of the first upper leg part and the first lower leg part, controlling torque of the first leg joint to adjust an included angle between the first upper leg part and a horizontal plane, to enable the first mechanical wheel to fall within the motion allowed region; and using a contact point between the first mechanical wheel and the motion allowed region as the force-bearing balance point in response to that the first mechanical wheel falls within the motion allowed region.

7. The method according to claim 1, wherein each leg of the first leg parts comprise a first upper leg part and a first lower leg part, the first upper leg part and the first lower leg part are connected by one of the bendable one or more first knee joints, and the first upper leg part is connected to the main body part, each of the one or more first knee joints comprises a groove plate, and the groove plate is correspondingly provided with at least one wheel groove; and the first lower leg part comprises an insertion rod, the insertion rod is controlled by a linear actuator to adjust a motion transmission state between the first lower leg part and the first knee joint, the linear actuator indicates a motor that converts electrical energy into linear motion mechanical energy, and the insertion rod is a mechanical component controlled by the linear actuator.

8. The method according to claim 7, wherein the method further comprises:

driving, in response to controlling the insertion rod to insert into the wheel groove, the first lower leg part to rotate along with rotation of the first knee joint by using the insertion rod; and canceling the motion transmission state between the first knee joint and the first lower leg part in response to controlling the insertion rod to retract from the wheel groove.

9. The method according to claim 1, wherein each leg of the second leg parts comprise a second upper leg part and a second lower leg part, the second upper leg part and the second lower leg part are connected by one of one or more bendable second knee joints, and the second upper leg part is connected to the main body part; and the controlling the second leg parts of the robot to be suspended by using the one or more first mechanical wheels as force-bearing balance points comprises:

controlling torque of the one or more first mechanical wheels and torque of the one or more second knee joints to control the second leg parts of the robot to be suspended, by using the second leg parts as force application points and the one or more first mechanical wheels as force- bearing points.

10. The method according to claim 9, wherein the method further comprises:

controlling rotation of the one or more first mechanical wheels to enable the robot to enter the balanced state, the balanced state indicating a state after the swing-up motion instruction is executed.

11. The method according to claim 10, wherein each leg of the first leg parts each comprise a first upper leg part and a first lower leg part, and the controlling rotation of the one or more first mechanical wheels to enable the robot to enter the balanced state comprises:

controlling the rotation of the one or more first mechanical wheels to adjust an included angle between the first upper leg part and the horizontal plane, when the included angle between the first upper leg part and the horizontal plane reach a preset adjustment condition, the robot entering the balanced state.

12. A swing-up motion apparatus of a robot, the robot comprising legs and a main body part connected to the legs, each of the legs comprising a bendable knee joint, and the knee joint comprising a mechanical wheel; the legs comprising first leg parts and second leg parts, each of first leg parts and the second leg parts comprising one or more of the legs, and the first leg parts and the second leg parts being arranged in order in a swing-up direction of the robot; and the apparatus comprising a memory and a processor coupled to the memory, the processor being configured to:

receive a swing-up motion instruction;

control, in response to the swing-up motion instruction, the first leg parts of the robot to be in a suspended state and out of contact with an operating plane, performing a leg retraction movement of the first leg parts, and at an end of the suspended state, placing one or more first mechanical wheels on one or more first knee joints of the first leg parts on the operating plane; and control the second leg parts of the robot to be suspended and keep stable in a balanced state, by using the one or more first mechanical wheels as force-bearing balance points.

13. The apparatus according to claim 12, wherein the processor is further configured to control torque of the one or more first knee joints in response to the swing-up motion instruction to bend the one or more first knee joints in a direction in which vertical heights between first mechanical wheels and a horizontal plane increase, until the first leg parts of the robot are in the suspended state.

14. The apparatus according to claim 13, wherein each leg of the first leg parts comprise a first upper leg part and a first lower leg part, the first upper leg part and the first lower leg part are connected by one of the bendable one or more first knee joints, and the first upper leg part is connected to the main body part; and the processor is further configured to control the torque of the one or more first knee joints to decrease included angles between the first upper leg parts and the first lower leg parts, to implement the leg retraction movement of the first leg parts.

15. The apparatus according to claim 14, wherein the first upper leg part is provided with a first magnetic component, the first lower leg part is provided with a second magnetic component, and a magnetic matching relationship exists between the first magnetic component and the second magnetic component; and the processor is further configured to control the torque of the one or more first knee joints to decrease the included angles between the first upper leg parts and the first lower leg parts; and when the included angles reach a preset included angle threshold, implement the leg retraction movement of the first leg parts via attraction between the first magnetic components provided on the first upper leg parts and the second magnetic components provided on the first lower leg parts.

16. The apparatus according to claim 12, wherein each leg of the first leg parts comprise a first upper leg part and a first lower leg part, the first upper leg part and the first lower leg part are connected by one of the bendable one or more first knee joints, and the first upper leg part is connected to the main body part; and the processor is further configured to determine a motion allowed region for each leg of the first leg parts, the motion allowed region referring to a region where the leg of the first leg parts is located on the operating plane during a swing-up motion of the robot; and using the motion allowed region as an operating plane support range for the first mechanical wheel during the leg retraction movement of the first upper leg part and the first lower leg part.

17. The apparatus according to claim 16, the robot comprises first leg joints, the first leg joints being configured to control torque of the first upper leg parts; and the processor is further configured to, during the leg retraction movement of the first upper leg part and the first lower leg part, control torque of the first leg joint to adjust an included angle between the first upper leg part and a horizontal plane, to enable the first mechanical wheel to fall within the motion allowed region; and use a contact point between the first mechanical wheel and the motion allowed region as the force-bearing balance point in response to that the first mechanical wheel falls within the motion allowed region.

18. The apparatus according to claim 12, wherein each leg of the first leg parts comprise a first upper leg part and a first lower leg part, the first upper leg part and the first lower leg part are connected by one of the bendable one or more first knee joints, and the first upper leg part is connected to the main body part, each of the one or more first knee joints comprises a groove plate, and the groove plate is correspondingly provided with at least one wheel groove; and the first lower leg part comprises an insertion rod, the insertion rod is controlled by a linear actuator to adjust a motion transmission state between the first lower leg part and the first knee joint, the linear actuator indicates a motor that converts electrical energy into linear motion mechanical energy, and the insertion rod is a mechanical component controlled by the linear actuator.

19. The apparatus according to claim 18, wherein the processor is further configured to:

drive, in response to controlling the insertion rod to insert into the wheel groove, the first lower leg part to rotate along with rotation of the first knee joint by using the insertion rod; and cancel the motion transmission state between the first knee joint and the first lower leg part in response to controlling the insertion rod to retract from the wheel groove.

20. A non-transitory computer-readable storage medium, having at least one instruction stored thereon, and the at least one instruction being loaded and executed by a processor of a robot to implement:

receiving a swing-up motion instruction, wherein the robot comprises legs and a main body part connected to the legs, each of the legs comprises a bendable knee joint, and the knee joint comprising a mechanical wheel; the legs comprise first leg parts and second leg parts, each of first leg parts and the second leg parts comprising one or more of the legs, and the second leg parts and the first leg parts being arranged in order in a swing-up direction of the robot;

controlling, in response to the swing-up motion instruction, the first leg parts of the robot to be in a suspended state and out of contact with an operating plane, performing a leg retraction movement of the first leg parts, and at an end of the suspended state, placing one or more first mechanical wheels on one or more first knee joints of the first leg parts on the operating plane; and controlling the second leg parts of the robot to be suspended and keeping stable in a balanced state, by using the one or more first mechanical wheels as force-bearing balance points.

* * * * *